United States Patent
Tian et al.

(10) Patent No.: US 11,870,708 B2
(45) Date of Patent: Jan. 9, 2024

(54) CONGESTION CONTROL METHOD AND APPARATUS

(71) Applicant: HUAWEI TECHNOLOGIES CO., LTD., Guangdong (CN)

(72) Inventors: Chen Tian, Shenzhen (CN); Lei Han, Shenzhen (CN); Kexin Liu, Shenzhen (CN); Wenhao Sun, Nanjing (CN); Ke Meng, Nanjing (CN); Yonghui Xu, Nanjing (CN); Long Yan, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/185,433

(22) Filed: Mar. 17, 2023

(65) Prior Publication Data

US 2023/0216809 A1 Jul. 6, 2023

Related U.S. Application Data

(63) Continuation of application No. PCT/CN2021/109387, filed on Jul. 29, 2021.

(30) Foreign Application Priority Data

Sep. 18, 2020 (CN) .......................... 202010988470.9

(51) Int. Cl.
*H04L 47/80* (2022.01)
*H04L 47/78* (2022.01)
*H04L 47/70* (2022.01)

(52) U.S. Cl.
CPC .......... *H04L 47/801* (2013.01); *H04L 47/781* (2013.01); *H04L 47/826* (2013.01)

(58) Field of Classification Search
None
See application file for complete search history.

(56) References Cited

U.S. PATENT DOCUMENTS

| 5,491,531 A * | 2/1996 | Adams .............. H04L 12/40013 |
| | | 370/431 |
| 2008/0298380 A1* | 12/2008 | Rittmeyer ............... H04L 47/50 |
| | | 370/395.42 |

FOREIGN PATENT DOCUMENTS

WO   WO-03025709 A2 *   3/2003   ............. G06F 15/00

* cited by examiner

*Primary Examiner* — Angela Nguyen

(57) ABSTRACT

A congestion control method and an apparatus are disclosed. The method includes: after a sending device generates an unscheduled data packet of a first flow, if it is determined, based on an unscheduled packet send window shared by all flows, that the unscheduled data packet meets a sending condition, determining whether to request to add a quota for at least one of the unscheduled packet send window and a scheduled packet send window corresponding to the first flow; and if it is determined that the quota is requested to be added for the at least one of the unscheduled packet send window and the scheduled packet send window corresponding to the first flow, setting indication information in the unscheduled data packet, and sending, to a receiving device, the unscheduled data packet in which the indication information is set.

18 Claims, 12 Drawing Sheets

CONGESTION CONTROL METHOD AND APPARATUS

CROSS-REFERENCE TO RELATED APPLICATIONS

This application is a continuation of International Application No. PCT/CN2021/109387, filed on Jul. 29, 2021, which claims priority to Chinese Patent Application No. 202010988470.9, filed on Sep. 18, 2020. The disclosures of the aforementioned applications are hereby incorporated by reference in their entireties.

TECHNICAL FIELD

The present disclosure relates to the field of communication technologies, and in particular, to a congestion control method and an apparatus.

BACKGROUND

A data center (DC) is a facility for housing a computer system and related auxiliary equipment (such as a communication network and a storage system). The data center generally includes redundant data communication connections, environmental control devices, monitoring devices, and various security apparatuses. These devices are usually placed in a same physical location under a same environment condition to facilitate security management and resource maintenance. A communication system that connects a computer server and a storage resource in the data center is referred to as a data center network (DCN). The data center network usually requires higher network bandwidth and a lower basic network transmission latency.

The data center carries high-performance and large-data-amount computing services and requires sub-µs-level low latency performance. The sub-µs-level low latency requires that a queue be kept in a light-overstock or non-overstock state, that is, an average queue depth is very low. As the data center network becomes super-large, a quantity of network nodes can reach tens of thousands or even hundreds of thousands. As a node scale, a bandwidth, and a switching capacity increase, an amount of multicast and burst data increases, which poses a higher requirement on the transmission latency.

In services such as cloud storage, a large quantity of concurrent flows exists on the data center network due to high concurrency of operations, which may cause network congestion. Network congestion may cause an extra latency, resulting in a high packet transmission latency, a low throughput, and consumption of massive resources.

Therefore, how to reduce a network transmission latency is a technical problem urgently to be resolved in a current data center network.

SUMMARY

Embodiments of the present disclosure provide a congestion control method and an apparatus, to reduce a network transmission latency and improve network performance.

According to a first aspect, a congestion control method is provided, including:

A sending device generates a to-be-sent unscheduled data packet of a first flow;

if the sending device determines, based on an unscheduled packet send window shared by all flows, that the unscheduled data packet meets a sending condition, the sending device determines whether to request to add a quota for at least one of the unscheduled packet send window and a scheduled packet send window corresponding to the first flow, where the scheduled packet send window corresponding to the first flow is used to determine whether a scheduled data packet of the first flow meets the sending condition; and if it is determined that the quota needs to be requested to be added for the at least one of the unscheduled packet send window and the scheduled packet send window corresponding to the first flow, the sending device sets indication information in the unscheduled data packet, and sends, to a receiving device, the unscheduled data packet in which the indication information is set, where the indication information indicates the receiving device to send a signaling packet, to trigger the sending device to add the quota for the at least one of the unscheduled packet send window and the scheduled packet send window corresponding to the first flow.

In the foregoing embodiment, on one hand, the shared unscheduled packet send window is set for all the flows, and whether an unscheduled data packet of any flow meets the sending condition is determined based on the unscheduled packet send window, so that congestion control can be performed, driven by a transmit end, on unscheduled data packets of all the flows. On the other hand, when it is determined that the sending condition is met, it is further determined whether the quota is requested to be added for the at least one of the unscheduled packet send window and the scheduled packet send window corresponding to the first flow, and when it is determined that the quota is requested to be added for the at least one of the unscheduled packet send window and the scheduled packet send window corresponding to the first flow, the indication information is set in the unscheduled data packet, so that the receiving device sends the signaling packet, to trigger the sending device to add the quota for the at least one of the unscheduled packet send window and the scheduled packet send window corresponding to the first flow. In this way, in the congestion control process driven by the transmit end, the indication information set in the unscheduled data packet is used, so that the receiving device can sense bandwidth required by the sending device, thereby implementing congestion control while performing data transmission by using the unscheduled data packet, further reducing a network transmission latency and improving a network throughput.

In a possible implementation, the determining whether to request to add a quota for at least one of the unscheduled packet send window and a scheduled packet send window corresponding to the first flow includes:

if a count value of a first counter reaches a specified threshold, determining that the quota needs to be requested to be added for the unscheduled packet send window, where the first counter is used to count an accumulated amount of data sent by unscheduled data packets of all the flows, and is cleared after it is determined that the quota needs to be requested to be added for the unscheduled packet send window; and if a count value of a second counter reaches the specified threshold, and the first flow still has to-be-sent data after one round-trip time, determining that the quota needs to be requested to be added for the scheduled packet send window corresponding to the first flow, where the second counter is used to count an accumulated amount of data sent by a data packet of the first flow, and is cleared after it is determined that the quota needs to be requested to be added for the scheduled packet send window corresponding to the first flow.

In the foregoing embodiment, if a count value of the first counter that is used to collect an amount of data sent by the unscheduled data packets of all the flows reaches the specified threshold, the quota is requested to be added for the unscheduled packet send window, so that the quota can be added for sending of the unscheduled data packet in a timely manner, to ensure transmission of the unscheduled data packet. If a count value of the second counter that is used to collect an amount of data sent by a data packet of a flow reaches the specified threshold and the flow still has to-be-sent data after one round-trip time, a quota is requested to be added for a scheduled packet send window corresponding to the flow, and the quota may be added for sending of the scheduled data packet in a timely manner based on a transmission requirement of the scheduled data packet, to ensure transmission of the scheduled data packet.

In some possible implementations, the method further includes: The sending device receives the signaling packet sent by the receiving device, and adds, based on the signaling packet, the quota for the at least one of the unscheduled packet send window and the scheduled packet send window corresponding to the first flow, where the added quota is equal to an amount of data corresponding to the specified threshold.

In the foregoing embodiment, the quota added for the unscheduled packet send window is set to be equal to the amount of data corresponding to the specified threshold, so that after sending an unscheduled data packet with a specific amount of data, the sending device may increase the unscheduled packet send window by the corresponding amount of data, thereby ensuring sending of the unscheduled data packet and implementing congestion control to avoid buffer queue overstock. The quota added for the scheduled packet send window is set to be equal to the amount of data corresponding to the specified threshold, so that the quota may be applied for in advance for transmission of the scheduled data packet of the first flow, thereby ensuring transmission of the scheduled data packet and implementing congestion control to avoid buffer queue overstock.

In some possible implementations, the method further includes: when the count value of the first counter reaches the specified threshold, reducing the unscheduled packet send window by a quota corresponding to the specified threshold; and when the count value of the second counter reaches the specified threshold, reducing the scheduled packet send window corresponding to the first flow by the quota corresponding to the specified threshold.

In some possible implementations, the setting indication information in the unscheduled data packet includes:
  if it is determined that the quota needs to be requested to be added for the unscheduled packet send window, setting first indication information in the unscheduled data packet, where the first indication information indicates the receiving device to send a debt signaling packet, and the debt signaling packet is used to trigger the sending device to add the quota for the unscheduled packet send window; and
  if it is determined that the quota needs to be requested to be added for the scheduled packet send window corresponding to the first flow, setting second indication information in the unscheduled data packet, where the second indication information indicates the receiving device to send a grant signaling packet, and the grant signaling packet is used to trigger the sending device to add the quota for the unscheduled packet send window corresponding to the first flow.

In the foregoing embodiment, when it is determined that the quota needs to be requested to be added for the unscheduled packet send window, the first indication information is set in the unscheduled data packet, so that the receiving device sends the debt signaling packet based on the first indication information, to trigger sending device to add the quota for the unscheduled packet send window. When it is determined that the quota needs to be requested to be added for the scheduled packet send window, the second indication information is set in the unscheduled data packet, so that the receiving device sends the grant signaling packet based on the second indication information, to trigger the sending device to add the quota for the scheduled packet send window.

In a possible implementation, the method further includes: The sending device receives the debt signaling packet, and adds the quota for the unscheduled packet send window based on the debt signaling packet; and/or the sending device receives the grant signaling packet, where the grant signaling packet carries indication information of the first flow, and the sending device adds, based on the grant signaling packet, the quota for the scheduled packet send window corresponding to the first flow.

In a possible implementation, the method further includes:
  The sending device generates a to-be-sent scheduled data packet of the first flow;
  if the sending device determines, based on the scheduled packet send window corresponding to the first flow, that the scheduled data packet meets the sending condition, the sending device determines whether to request to add the quota for the scheduled packet send window corresponding to the first flow;
  if it is determined that the quota needs to be requested to be added for the scheduled packet send window corresponding to the first flow, the sending device sets indication information in the scheduled data packet, where the indication information indicates the receiving device to send the grant signaling packet; and
  the sending device receives the grant signaling packet sent by the receiving device, where the grant signaling packet carries the indication information of the first flow, and the sending device adds, based on the grant signaling packet, the quota for the scheduled packet send window corresponding to the first flow.

In the foregoing embodiment, the sending device sets the indication information in the scheduled data packet, so that the receiving device sends the grant signaling packet, to trigger the sending device to add, based on the grant signaling packet, the quota for the scheduled packet send window corresponding to the flow, thereby implementing congestion control driven by the transmit end, controlling transmission of the scheduled data packet based on a sending status of the scheduled data packet of the sending device, and implementing congestion control to avoid buffer queue overstock.

In a possible implementation, an initial value of the unscheduled packet send window is configured as RTTByte*m bytes, RTTByte indicates a quantity of bytes that can be sent in one round-trip time, and m is an integer greater than or equal to 1; and an initial value of the scheduled packet send window corresponding to the first flow is configured as 0.

In the foregoing embodiment, the initial value of the unscheduled packet send window is set to RTTByte*m bytes, and the initial value of the scheduled packet send window is set to 0, which is equivalent to that the quota is added in advance for transmission of the unscheduled data packet, so that transmission of the unscheduled data packet can be preferably ensured. For transmission of the scheduled data packet of the first flow, an initial value of a corresponding scheduled packet send window is set to 0, and after a specific amount of data has been transmitted in the first flow, the quota is added for the scheduled packet send window corresponding to the flow, which is equivalent to that transmission of the scheduled data packet is controlled in a targeted manner based on a sending amount of data of the flow, thereby implementing congestion control to avoid buffer queue overstock.

According to a second aspect, a congestion control method is provided, including:

A receiving device receives a data packet sent by a sending device;

if first indication information is set in the data packet, the receiving device generates a debt signaling packet, and sends the debt signaling packet to the sending device, where the debt signaling packet is used to trigger the sending device to add a quota for an unscheduled packet send window shared by all flows; and if second indication information is set in the data packet, the receiving device generates a grant signaling packet, and sends the grant signaling packet to the sending device, where the grant signaling packet carries flow indication information, the flow indication information is the same as flow indication information carried in the data packet, and the grant signaling packet is used to trigger the sending device to add a quota for a scheduled packet send window corresponding to a corresponding flow.

In a possible implementation, when sending the debt signaling packet and the grant signaling packet, the sending device sends the debt signaling packet and the grant signaling packet based on a packet sending rate shared by the debt signaling packet and the grant signaling packet.

According to a third aspect, a communication apparatus is provided, where the communication apparatus includes at least one processor, the at least one processor is connected to a memory, and the at least one processor is configured to read and execute a program stored in the memory, to enable the apparatus to perform the method according to any one of the foregoing first aspect.

According to a fourth aspect, a communication apparatus is provided, where the communication apparatus includes at least one processor, the at least one processor is connected to a memory, and the at least one processor is configured to read and execute a program stored in the memory, to enable the apparatus to perform the method according to any one of the foregoing second aspect.

According to a fifth aspect, a chip is provided, where the chip is coupled to a memory, and is configured to read and execute program instructions stored in the memory, to implement the method according to any one of the first aspect.

According to a sixth aspect, a chip is provided, where the chip is coupled to a memory, and is configured to read and execute program instructions stored in the memory, to implement the method according to any one of the second aspect.

According to a seventh aspect, a computer-readable storage medium is provided, where the computer-readable storage medium stores computer instructions, and when the instructions are run on a computer, the computer is enabled to perform the method according to any one of the first aspect.

According to an eighth aspect, a computer-readable storage medium is provided, where the computer-readable storage medium stores computer instructions, and when the instructions are run on a computer, the computer is enabled to perform the method according to any one of the second aspect.

According to a ninth aspect, a computer program product is provided, where the computer program product is invoked by a computer, the computer is enabled to perform the method according to any one of the first aspect.

According to a tenth aspect, a computer program product is provided, where the computer program product is invoked by a computer, the computer is enabled to perform the method according to any one of the second aspect.

BRIEF DESCRIPTION OF DRAWINGS

FIG. 7a-1 and FIG. 7a-2 are a schematic diagram of a process in which a sending device sends an unscheduled data packet and performs congestion control on transmission of the unscheduled data packet according to an embodiment of the present disclosure;

FIG. 7b-1 and FIG. 7b-2 are a schematic diagram of a process in which a sending device sends a scheduled data packet and performs congestion control on transmission of the scheduled data packet according to an embodiment of the present disclosure;

DESCRIPTION OF EMBODIMENTS

To make objectives, technical solution, and advantages of embodiments of the present disclosure clearer, the following further describes embodiments of the present disclosure in detail with reference to the accompanying drawings.

The following describes some terms in embodiments of the present disclosure, to facilitate understanding of a person skilled in the art.

(1) Flow

A set of unidirectional data packets sent from a source endpoint to a destination endpoint forms a flow. Generally, a flow is defined by using a quintuple (protocol type, source IP address, destination IP address, source port number, and destination port number) or other information that can be used to distinguish the flow.

(2) Send Window

The send window is used for traffic control. A size of the send window determines a maximum quantity of bytes that are allowed to be transmitted by a transmit end. Generally, the size of the send window is expressed in bytes. In embodiments of the present disclosure, a quantity of bytes allocated to the send window may be referred to as a quota of the send window, and the quota of the send window may decrease as data sending. Alternatively, the size of the send window may be increased by adding the quota for the send window. In other words, in embodiments of the present disclosure, adding the quota for the send window may be understood as increasing the size of the send window. For example, adding a quota of M bytes for the send window means that the size of the send window is increased by M bytes.

The terms "system" and "network" may be used interchangeably in embodiments of the present disclosure. "A plurality of" means two or more. In view of this, in embodiments of the present disclosure, "a plurality of" may also alternatively be understood as "at least two". "At least one" may be understood as one or more, for example, one, two, or more. For example, "include at least one" means "include one, two, or more", and there is no limitation on which is included. For example, "include at least one of A, B, and C" may mean "include A, B, or C", "include A and B, A and C, or B and C", or "include A, B, and C". The term "and/or" describes an association relationship for describing associated objects and represents that three relationships may exist. For example, A and/or B may represent any one of the following three cases: Only A exists, both A and B exist, or only B exists. In addition, the character "/" generally indicates an "or" relationship between the associated objects.

Unless otherwise specified, ordinal numbers such as "first" and "second" in embodiments of the present disclosure are used to distinguish between a plurality of objects, and are not intended to limit a sequence, a time sequence, priorities, or importance of the plurality of objects.

Figure 1:
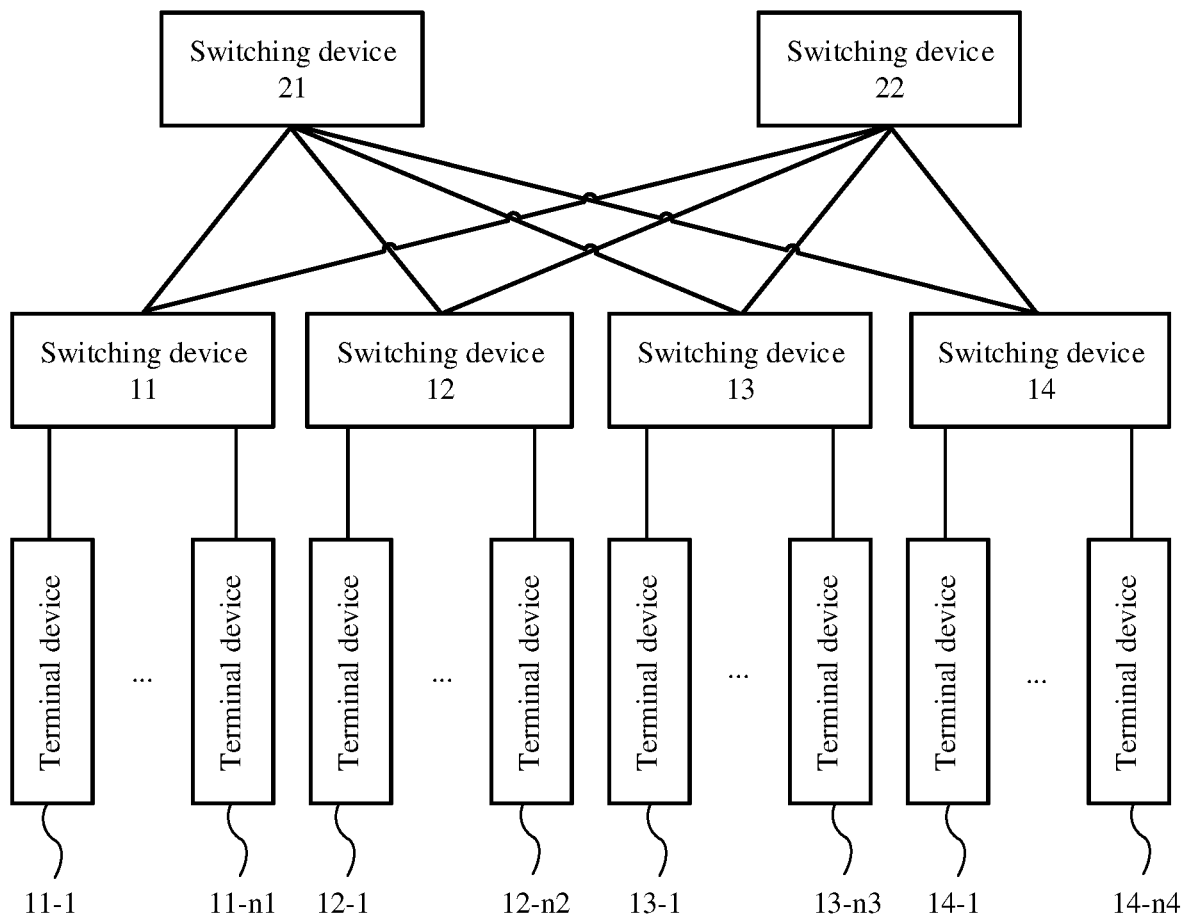
FIG. 1 is a schematic diagram of a network architecture according to an embodiment of the present disclosure.

FIG. 1 shows an example of a data center network to which embodiments of the present disclosure may be applied.

As shown in FIG. 1, the data center network includes two levels of switching devices, where a level-1 switching device is closer to a terminal device than a level-2 switching device. The level-1 switching device includes switching devices 11 to 14, and the level-2 switching device includes switching devices 21 and 22. One level-1 switching device may be connected to one or more terminal devices. For example, the switching device 11 in the figure is connected to a terminal device 11-1 to a terminal device 11-n1 (n1 represents an integer greater than 1).

One terminal device may serve as a sending device to send data to another terminal device, or may serve as a receiving device to receive data sent by another terminal device.

Data sent by one sending device may be routed to a receiving device through a level-1 switching device. For example, data sent by the terminal device 11-1 is routed to the terminal device 11-n1 through the switching device 11. Alternatively, data sent by one sending device may be routed to a receiving device through multi-levels of switching devices. For example, data sent by a terminal device 12-1 is routed to the terminal device 11-1 through the switching device 12, the switching device 21, and the switching device 11 in sequence.

The switching device may be a device that can implement a data transmission and forwarding function, such as a switch or a router. The terminal device may be a device that has a data processing function, for example, a server.

FIG. 1 is only an example, and does not constitute a limitation on a quantity, a type, and the like of devices included in the data center network. The data center network described in embodiments of the present disclosure is intended to describe the technical solutions in embodiments of the present disclosure, and do not constitute a limitation on the technical solutions provided in embodiments of the present disclosure. A person of ordinary skill in the art may know that: With evolution of a network architecture, the technical solutions provided in embodiments of the present disclosure may be applied to a similar switching network.

Currently, a congestion control method used in the data center network includes a transmit-end-driven congestion control method and a receive-end-driven congestion control method.

Figure 2:
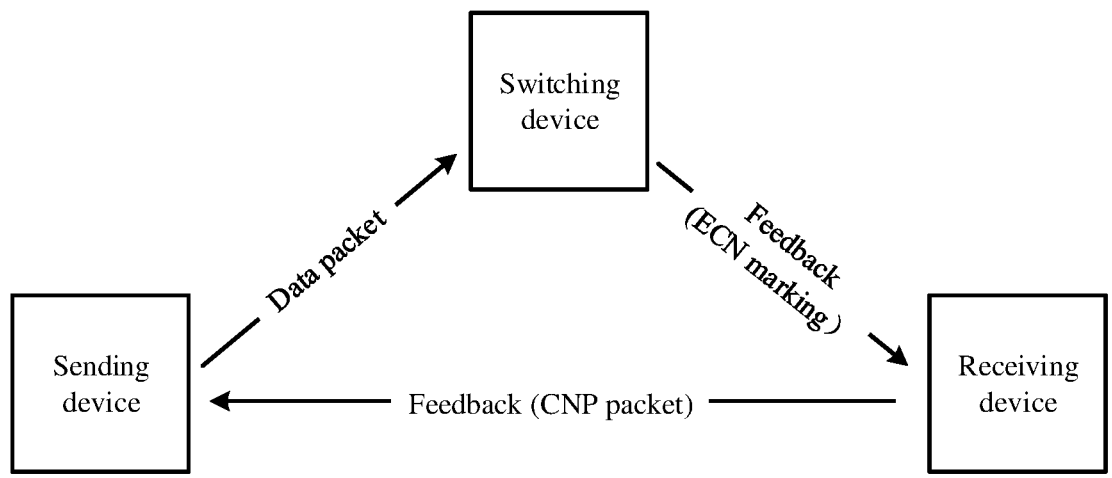
FIG. 2 is a schematic diagram of a DCQCN congestion control mechanism.

In the transmit-end-driven congestion control method, a sending device actively detects a network status and inspiringly adjusts a sending rate or a send window of a data packet based on a network feedback. FIG. 2 shows an example of the transmit-end-driven congestion control method. A data center quantized congestion notification (DCQCN) algorithm is used as an example. As shown in the figure, a sending device first sends a data packet based on a maximum capability (usually a line rate) of the sending device. A switching device receives the data packet sent by the sending device. When detecting that buffer queue overstock occurs at a port of the switching device and a specified threshold is exceeded, the switching device performs explicit congestion notification (ECN) marking on the data packet, and then sends an ECN-marked data packet to a receiving device. After receiving the ECN-marked data packet, the receiving device returns a congestion notification packet (CNP) to the sending device. After receiving the CNP packet, the sending device adjusts a sending rate to relieve network congestion. After the congestion is relieved, the sending device increases the data sending speed until a next CNP packet is received.

Figure 3A:
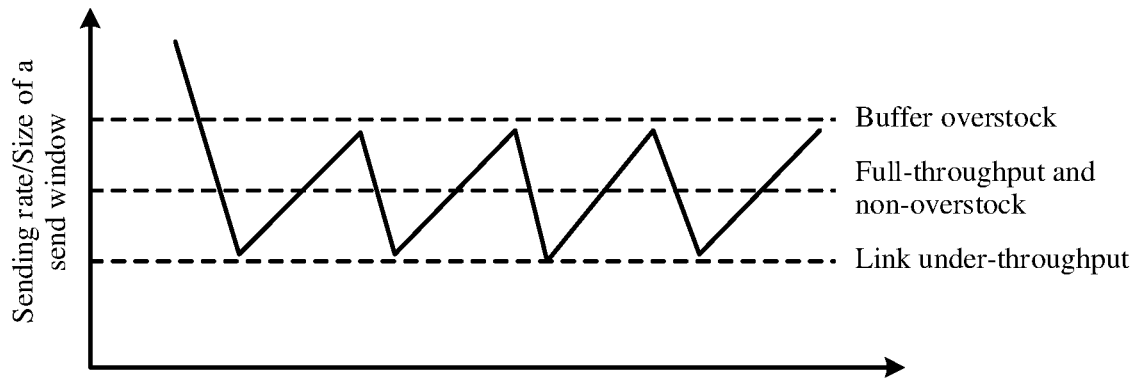
FIG. 3a is a diagram in which a sending rate/window size of a DCQCN congestion control algorithm changes with time.
Figure 3B:
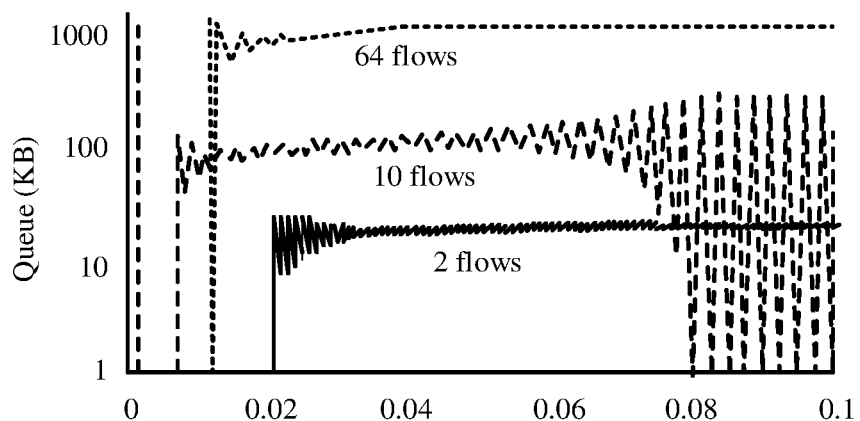
FIG. 3b is a diagram in which a queue length of a DCQCN congestion control algorithm changes with time.

As shown in FIG. 3a and FIG. 3b, in the transmit-end-driven congestion control method, a feedback latency that cannot be ignored exists due to a network status feedback. Based on an ECN-marked feedback and a speed control mechanism, the sending rate (or a send window) is in a fluctuation-type stable state, and there is no fixed stable point. As shown in FIG. 3a, the sending rate or the send window fluctuates between a link under-throughput state and a buffer overstock state, and a speed adjustment pace is one period of a round-trip time (RTT) slower than a real network state. Consequently, a queue length of a network device is long in a traffic rate increase process. A queue depth of a bottleneck network device is positively correlated with a quantity of flows and the sending rate (or the send window), and there is no fixed theoretical upper limit, as shown in FIG. 3b. A large queue depth increases a queue latency and further affects performance indicators such as service completion time. When a transmit end drives a plurality of flows to increase rates at the same time, priority-based flow control (PFC) may be triggered, resulting in a network under-throughput.

In the receive-end-driven congestion control method, a receive device sends a signaling packet to drive a sending device to send a data packet, and the receiving device and a switch perform rate limiting transmission on the signaling packet to allocate data bandwidth, to complete flow control before data packet sending. The Expresspass method and the Homa method are two typical receive-end-driven congestion control methods.

A principle of the Expresspass method is as follows: After a connection is established between a sending device and a receiving device, the receiving device sends a signaling packet, the sending device determines a rate of sending a data packet based on a rate of receiving the signaling packet, and a switch limits the rate of the signaling packet to ensure that the data packet is not stocked on a network.

Figure 4A:
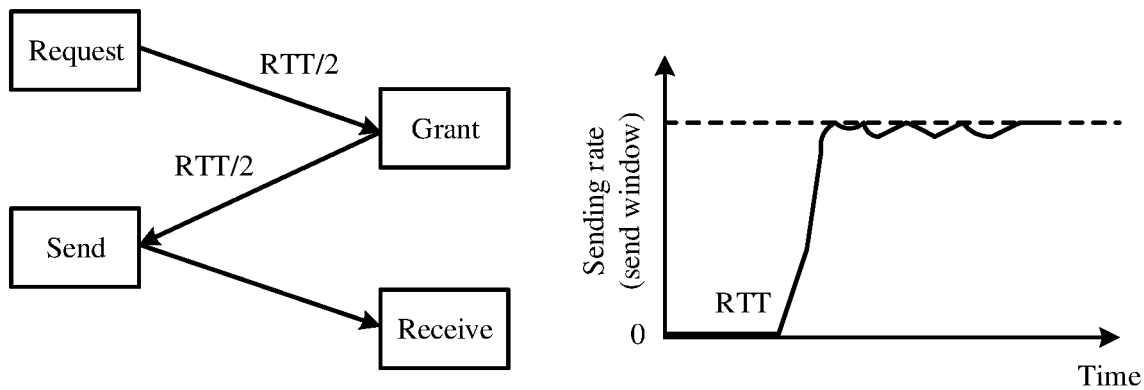
FIG. 4a and FIG. 4b are schematic diagrams of an Expresspass congestion control method.
Figure 4B:
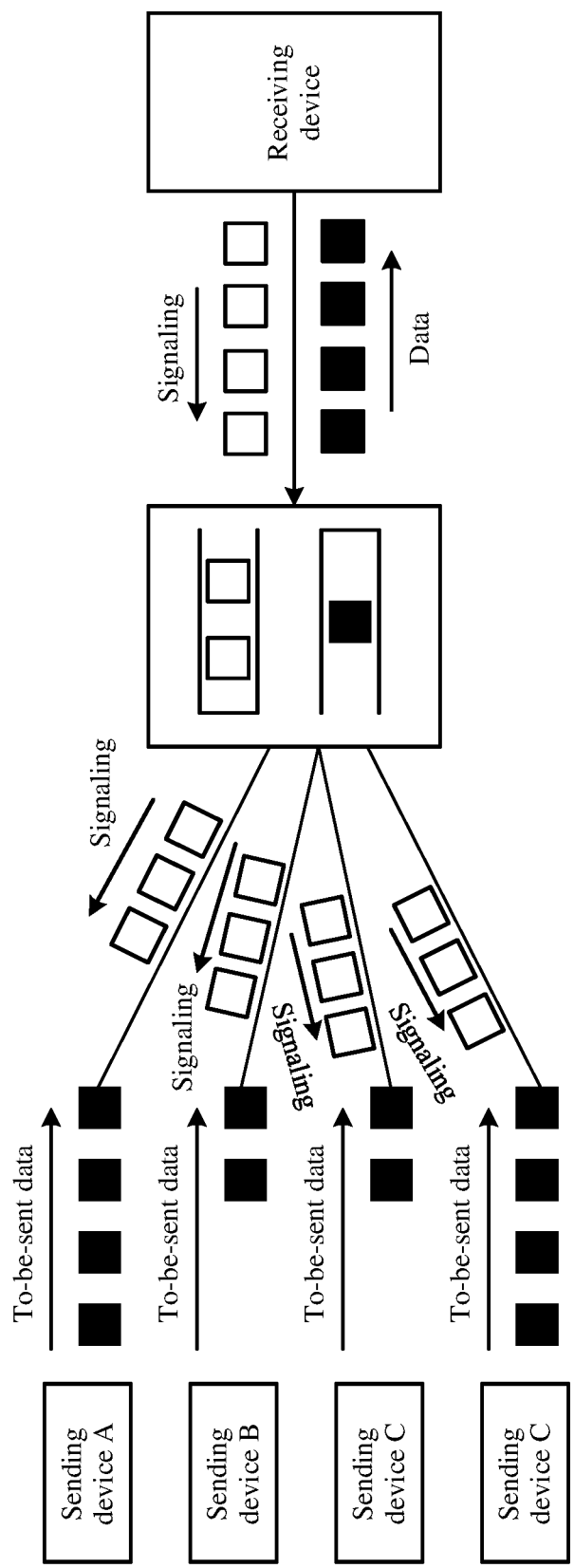

According to the method, signaling is requested from the receiving device at an initial stage of flow establishment, which causes a waste of bandwidth in a first RTT period and greatly increases completion time of a small flow, as shown in FIG. 4a. The receiving device perceives that there is a feedback latency in a bandwidth resource required by the sending device. As a result, signaling cannot be allocated as required and a network under-throughput occurs, and impact is relatively large when there are many small flows, as shown in FIG. 4b.

A principle of the Homa method is as follows: When a flow arrives at a sending device, one RTT byte (that is, a quantity of bytes that can be sent in one RTT) of unscheduled data is blindly sent. After receiving a GRANT signaling, the remaining data is sent as a scheduled data packet. In addition, a priority queue of a switch is used to preferably send a small flow, which greatly shortens completion time of the small flow.

Figure 5:
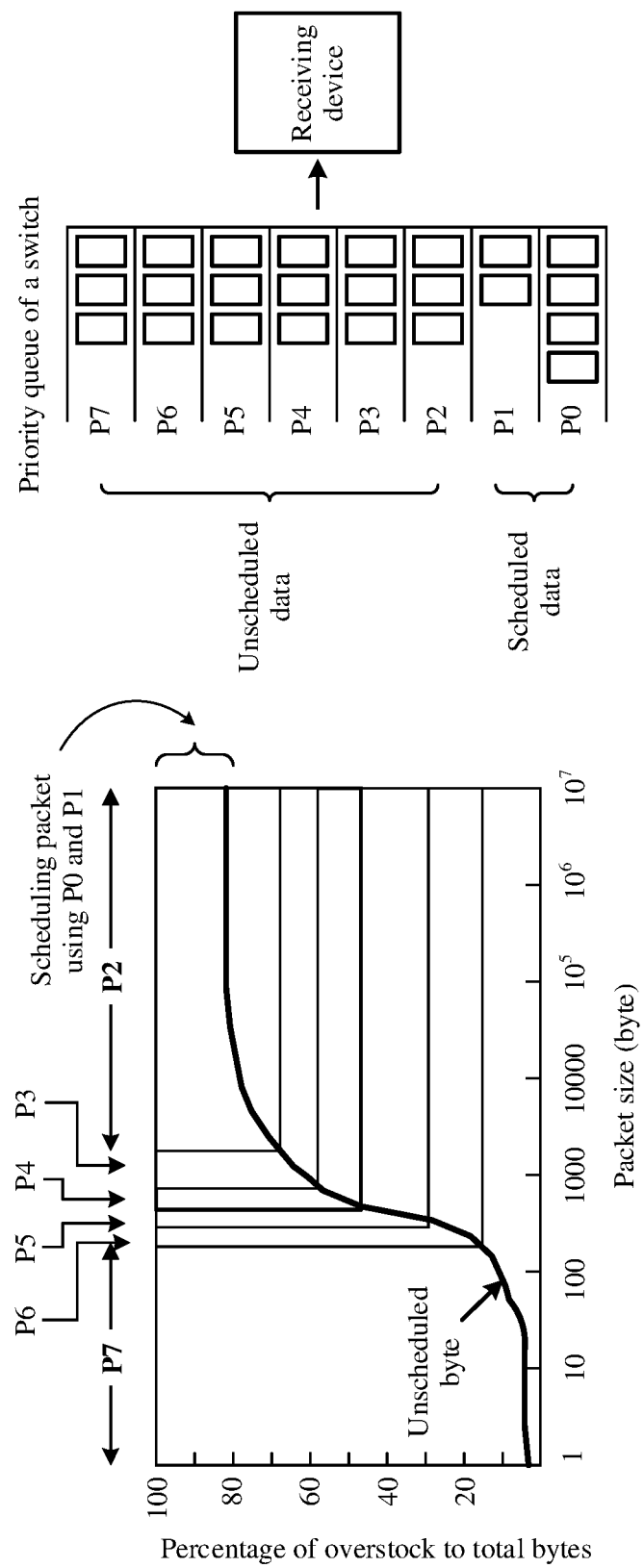
FIG. 5 is a schematic diagram of a Homa congestion control method.

In this method, congestion control driven by the transmit end is still used for an unscheduled data packet, so that buffer overstock is directly proportional to a quantity of concurrent flows, and a buffer peak value is not limited. Consequently, queue congestion of the switch occurs and a packet is lost. In addition, a large quantity of priority queues of the switch needs to be used in this method, as shown in FIG. 5, and technical implementation is complex.

It can be learned that, in both the transmit-end-driven congestion control method and the receive-end-driven congestion control method, transmission latencies need to be improved.

Based on the foregoing existing problem, embodiments of the present disclosure provide a congestion control method and an apparatus, to reduce a network transmission latency and improve network performance. The method and an apparatus are based on a same inventive concept. Because the method and the apparatus have a similar problem-resolving principle, for implementations of the apparatus and the method, refer to each other, and no repeated description is provided.

Embodiments of the present disclosure are applicable to a switching network, for example, a data center network. The data center network shown in FIG. 1 is used as an example. The congestion control method provided in this embodiment may be implemented on a terminal device, that is, implemented on a terminal device used as a sending device and a receiving device.

Figure 6:
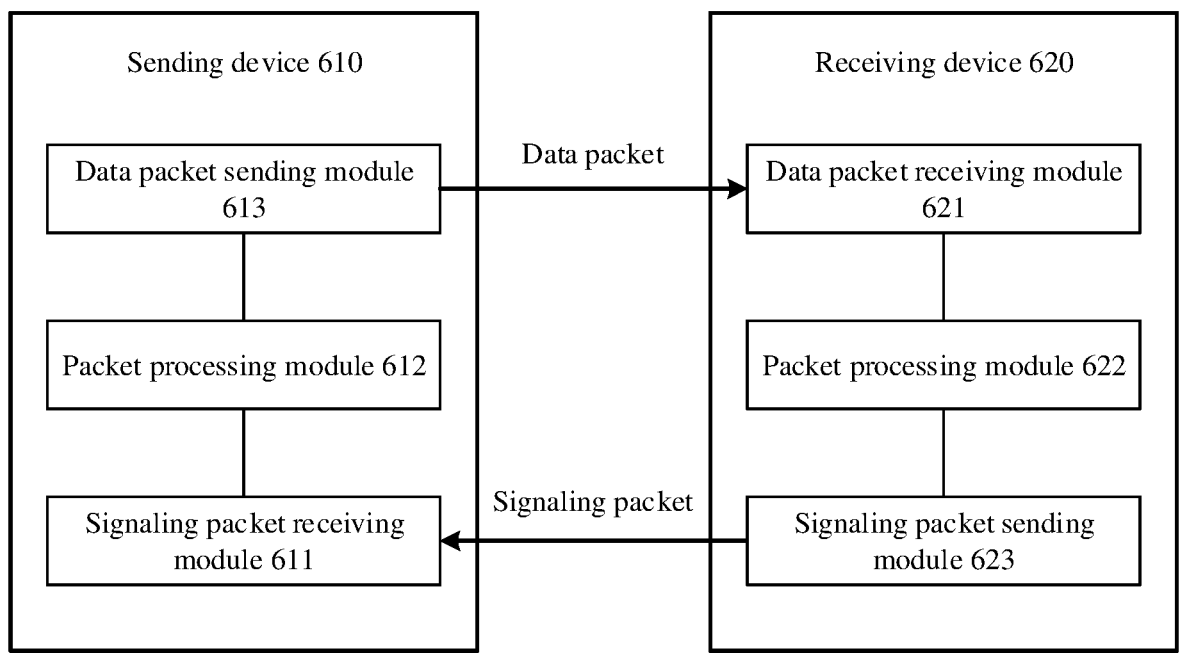
FIG. 6 is a schematic diagram of functional structures of a sending device and a receiving device according to an embodiment of the present disclosure.

FIG. 6 is an example of a schematic diagram of functional structures of a sending device and a receiving device according to an embodiment of the present disclosure.

As shown in the figure, the sending device 610 may include the following modules: a signaling packet receiving module 611, a packet processing module 612, and a data packet sending module 613. The receiving device 620 may include the following modules: a data packet receiving module 621, a packet processing module 622, and a signaling packet sending module 623.

At the sending device 610 end, the signaling packet receiving module 611 is configured to: receive a signaling packet, extract signaling packet information, and transfer extracted signaling packet information to the packet processing module 612, where the signaling packet information may include signaling packet type information, and further may include flow indication information. In this embodiment, a signaling packet type includes a debt signaling packet and a grant signaling packet, and the flow indication information may be information used to identify a flow, such as a quintuple.

The packet processing module 612 is configured to: receive the signaling packet information from the signaling packet receiving module 611, and add a quota for a corresponding send window based on the signaling packet type in the signaling packet information; when there is a to-be-sent data packet, determine, based on the corresponding send window, whether a sending condition is met; set indication information in the to-be-sent data packet to indicate the receiving device to send the signaling packet; and transmit the data packet in which the indication information is set to the data packet sending module 613. The signaling packet is used to trigger the sending device to add the quota for the send window of the corresponding data packet, to implement congestion control.

The data packet sending module 613 is configured to: send a data packet encapsulated by the packet processing module 612 to the receiving device through a link. Optionally, when sending the data packet, the module may send the data packet based on a priority of type division of the data packet. For example, a priority of an unscheduled data packet may be set to be higher than that of a scheduled data packet, so that the unscheduled data packet may be preferably sent.

At the receiving device 620 end, the data packet receiving module 621 is configured to: receive a data packet from the data packet sending module 613 of the sending device, and if the indication information is extracted from the received data packet, send the indication information to the packet processing module 622.

The packet processing module 622 is configured to: receive the indication information from the data packet receiving module 621, generate a corresponding signaling packet based on the indication information, and send the signaling packet to the signaling packet sending module 623.

The signaling packet sending module 623 is configured to: receive the signaling packet generated by the packet processing module 622 and send the signaling packet to the sending device. Optionally, when sending the signaling packet, the signaling packet sending module 623 may control sending of the signaling packet based on a specified sending rate.

The data center network shown in FIG. 1 is used as an example. One terminal device may be used as a sending device or a receiving device. Therefore, one terminal device may include function modules in the sending device shown in FIG. 6, and may further include function modules of the receiving device.

In this embodiment, the data packet includes an unscheduled data packet and a scheduled data packet. A data packet that can be sent in a first RTT of each flow is classified as an unscheduled data packet, and a data packet that is sent subsequently is classified as a scheduled data packet. In other words, data carried in an unscheduled data packet of a flow is data within a data length corresponding to a first RTT of the flow. For example, if a link bandwidth is denoted as C, a quantity of bytes that can be sent in one RTT is C*RTT/8. In this case, data of first C*RTT/8 bytes of a flow is classified as unscheduled data, and a packet used to transmit the unscheduled data is referred to as an unscheduled data packet.

Packet type indication information may be carried in the data packet, to indicate whether the packet is an unscheduled data packet and a scheduled data packet. Certainly, the packet type indication information may not be set in the data packet. This is not limited in embodiments of the present disclosure.

In this embodiment, the sending device may maintain different send windows for the unscheduled data packet and the scheduled data packet. Specifically, an unscheduled packet send window shared by all flows may be maintained for unscheduled data packets of all the flows. That is, sending of the unscheduled data packets of all the flows depends on a quota provided by the unscheduled packet send window. Only when a sending condition of the unscheduled data packet is met, that is, a size of the unscheduled packet send window of the sending device is greater than or equal to a length of a to-be-sent unscheduled data packet, the unscheduled data packet is allowed to be sent.

An initial value of the unscheduled packet send window may be configured as RTTByte*m, where RTTByte represents a quantity of bytes that can be sent in one RTT, m is an integer greater than or equal to 1, and m may be set and adjusted based on a buffer size of the switching device and network performance.

The sending device may maintain, for each flow, a scheduled packet send window corresponding to the flow. For example, a flow 1 corresponds to a scheduled packet send window 1, and a flow 2 corresponds to a scheduled packet send window 2. For a flow, sending of a scheduled data packet of the flow depends on a quota provided by a scheduled packet send window corresponding to the flow. Only when a sending condition of the scheduled data packet is met, that is, a size of the scheduled packet send window corresponding to the flow is greater than or equal to a length of a to-be-sent scheduled data packet of the flow, the scheduled data packet is allowed to be sent. The initial value of the unscheduled packet send window may be set to 0.

It should be noted that the foregoing naming of the send window is merely an example, and a naming manner of the send window is not limited in the present disclosure.

The size of the unscheduled packet send window varies with sending of the unscheduled data packet. Specifically, a first counter may be set to count an accumulated amount of data sent by the unscheduled data packets of all the flows, and the first counter is cleared after it is determined that the quota needs to be requested to be added for the unscheduled packet send window. When a count value of the first counter reaches a specified threshold, the unscheduled packet send window is reduced by a quota corresponding to the specified threshold. For example, when a quantity of bytes counted by the first counter reaches M bytes, the unscheduled packet send window is reduced by M bytes, where M is a preset value, and M may be set to be less than one RTT Byte. For example, M may be equal to a quantity of bytes of a maximum transmission unit (MTU).

Certainly, alternatively, each time the unscheduled data packet is sent, the unscheduled packet send window may be reduced by a quota corresponding to an amount of data of the unscheduled data packet.

The size of the scheduled packet send window varies with sending of the scheduled data packet. Specifically, a corresponding counter may be set for each flow, and is used to count an amount of data sent by a data packet of the flow. A first flow is used as an example. A second counter may be set to count a quantity of bytes sent by a data packet of the first flow, and the second counter is cleared after it is determined that a quota needs to be requested to be added for a scheduled packet send window corresponding to the first flow. When a count value of the second counter reaches a specified threshold, the scheduled packet send window corresponding to the first flow is reduced by a quota corresponding to the specified threshold. For example, when a quantity of bytes counted by the second counter corresponding to the first flow reaches M bytes, the scheduled packet send window corresponding to the first flow is reduced by M bytes.

Certainly, alternatively, each time one data packet (including the scheduled data packet and the unscheduled data packet) of the first flow is sent, the scheduled packet send window corresponding to the first flow may be reduced by a quota corresponding to an amount of data of the data packet.

In this embodiment, a type of the signaling packet may include a debt signaling packet and a grant signaling packet. The grant signaling packet and the debt signaling packet are generated by the receiving device and sent to the sending device.

The debt signaling packet is used to trigger the sending device to add the quota for the unscheduled packet send window, that is, increase the size of the unscheduled packet send window. In some embodiments, after the sending device receives a debt signaling packet, the quota added for the unscheduled packet send window is equal to a specific amount of data. For example, when the count value of the first counter used to count the amount of data sent by the unscheduled data packets of all the flows reaches M bytes, the sending device may indicate the receiving device to send the debt signaling packet. In this way, each time the sending device receives a debt signaling packet, the size of the unscheduled packet send window is increased by M bytes.

The grant signaling packet is used to trigger the sending device to add the quota for the scheduled packet send window, that is, increase the size of the scheduled packet send window. In some embodiments, after the sending device receives a grant signaling packet, the quota added for the scheduled packet send window corresponding to the first flow is equal to a specific amount of data. For example, when the count value of the second counter used to count the amount of data sent by the data packet of the first flow reaches M bytes, the sending device may indicate the receiving device to send the grant signaling packet. In this way, each time the sending device receives a grant signaling packet corresponding to a flow, a size of a scheduled packet send window corresponding to the flow is increased by M bytes.

It should be noted that the foregoing naming of the signaling packet is merely an example, and a naming manner of the signaling packet is not limited in the present disclosure.

Both headers of the debt signaling packet and the grant signaling packet may carry signaling packet type indication information. The signaling packet type indication information in the debt signaling packet indicates that the signaling packet is a debt signaling packet, and the signaling packet type indication information in the grant signaling packet indicates that the signaling packet is a grant signaling packet. The grant signaling packet further carries flow indication information, for example, a quintuple, so that the sending device increases, for a corresponding flow based on the flow indication information, a size of a scheduled packet send window corresponding to the flow.

The receiving device may generate the debt signaling packet based on first indication information carried in the data packet sent by the sending device, where the first indication information indicates the receiving device to generate the debt signaling packet, to trigger the sending device to add the quota for the unscheduled packet send window. The receiving device may generate the grant signaling packet based on second indication information in the data packet sent by the sending device, where the second indication information indicates the receiving device to generate the grant signaling packet, to trigger the sending device to add the quota for the scheduled packet send window.

Optionally, to reduce signaling overheads, the first indication information and the second indication information may each be a 1-bit flag bit, for example, a flag bit A and a flag bit B. The sending device sets the flag bit A in a packet header of the data packet (for example, a value of the flag bit A is set to 1) to indicate the receiving device to generate the debt signaling packet, and the sending device sets the flag bit B in a packet header of the data packet (for example, a value of the flag bit B is set to 1) to indicate the receiving device to generate the grant signaling packet. For example, if the flag bit A in the header of the data packet received by the receiving device is set to 1, the debt signaling packet is generated and sent, and if the flag bit A is set to 0, no debt signaling packet is sent; or if the flag bit B in the header of the data packet received by the receiving device is set to 1, the grant signaling packet is generated and sent, and if the flag bit B is set to 0, no grant signaling packet is generated.

The flag bit A and the flag bit B may be a reserved field or a field that is allowed to be customized in an existing packet format in an existing standard, protocol, or specification, or may be another user-defined format that implements a same function. For example, in the RoCEv2 specification, an ECN field in an IP header is used for a congestion flag. This embodiment does not describe use of the ECN congestion flag, and the ECN field may be used as the foregoing flag bit. Similarly, a reserved field of a basic header BTH defined in the RoCEv2 specification may also be used as the foregoing flag bit.

Based on the foregoing definition or rule, the transmit-end-driven and receive-end-driven congestion control method is used in this embodiment. The transmit-end-driven congestion control method is used for the unscheduled data packet, and the receive-end-driven congestion control method is used for the scheduled data packet.

A first flow is used as an example. For an unscheduled data packet of the first flow, when determining that the to-be-sent unscheduled data packet meets a sending condition, the sending device further determines whether to request to add a quota for at least one of an unscheduled packet send window and a scheduled packet send window corresponding to the first flow, and performs the following processing based on a determined result:

(1) If it is determined that the quota needs to be added only for the unscheduled packet send window, first indication information is set in the to-be-sent unscheduled data packet (for example, a flag bit A is set), and the unscheduled data packet in which the first indication information is set is sent.

When the following condition is met, the sending device determines that the quota needs to be requested to be added for the unscheduled packet send window: a count value of a first counter reaches a specified threshold (or is referred to as greater than or equal to the specified threshold). A definition of the first counter is as described above, and the count value of the first counter includes a quantity of bytes of an unscheduled data packet that is currently determined to meet the sending condition. For example, when a quantity of bytes that are of unscheduled data packets of all flows and that are counted by the first counter reaches M bytes, the sending device determines that the quota needs to be requested to be added for the unscheduled packet send window. For a definition of M, refer to the foregoing embodiment.

(2) If it is determined that the quota needs to be added only for the scheduled packet send window corresponding to the first flow, second indication information is set in the to-be-sent unscheduled data packet (for example, a flag bit B is set), and the unscheduled data packet in which the second indication information is set is sent.

When the following condition is met, the sending device determines that the quota needs to be requested to be added for the scheduled packet send window corresponding to the first flow: a count value of a second counter reaches a specified threshold (or is referred to as greater than or equal to the specified threshold), and the first flow still has to-be-sent data after one RTT. A definition of the second counter is as described above, and the count value of the second counter includes a quantity of bytes of an unscheduled data packet that is currently determined to meet the sending condition. For example, when a quantity of bytes that are sent by the data packet of the first flow and that are counted by the second counter reaches M bytes, the sending device determines that the quota needs to be requested to be added for the scheduled packet send window corresponding to the first flow. For a definition of M, refer to the foregoing embodiment.

(3) If it is determined that the quota needs to be added for the unscheduled packet send window and the quota needs to be added for the scheduled packet send window corresponding to the first flow, first indication information (for example, a flag bit A is set) and second indication information (for example, a flag bit B is set) are set in the to-be-sent unscheduled data packet, and the unscheduled data packet in which the first indication information and the second indication information is set is sent.

(4) If it is determined that the quota does not need to be added for the unscheduled packet send window and the quota does not need to be added for the scheduled packet send window corresponding to the first flow, the first indication information and the second indication information are not set in the unscheduled data packet, but the unscheduled data packet is directly sent.

Further, if it is determined that the to-be-sent unscheduled data packet does not meet the sending condition, the unscheduled data packet is refused to be sent, or the unscheduled data packet is sent after the sending condition is met.

A first flow is still used as an example. For a scheduled data packet of the first flow, when determining that the to-be-sent scheduled data packet of the first flow meets a sending condition, the sending device further determines whether to request to add a quota for a scheduled packet send window corresponding to the first flow. If the quota needs to be added for the scheduled packet send window corresponding to the first flow, the sending device sets second indication information (for example, a flag bit B is set) in the to-be-sent scheduled data packet, and then sends the scheduled data packet. If the quota does not to be added for the scheduled packet send window corresponding to the first flow, the scheduled data packet is directly sent. If it is determined that the to-be-sent scheduled data packet does not meet the sending condition, the scheduled data packet is refused to be sent, or the scheduled data packet is sent after the sending condition is met.

When the following condition is met, the sending device determines that the quota needs to be requested to be added for the scheduled packet send window corresponding to the first flow: a count value of a second counter reaches a specified threshold (or is referred to as greater than or equal to the specified threshold), and the first flow still has to-be-sent data after one RTT. The count value of the second counter includes a quantity of bytes of an unscheduled data packet that is currently determined to meet the sending condition. For example, when a quantity of bytes that are sent by the data packet of the first flow and that are counted by the second counter reaches M bytes, the sending device determines that the quota needs to be requested to be added for the scheduled packet send window corresponding to the first flow. For a definition of M, refer to the foregoing embodiment.

It can be learned from the foregoing embodiment that the unscheduled data packet uses the transmit-end-driven congestion control method, and when a new flow arrives, the unscheduled data packet can be sent provided that there is still a remaining quota in the unscheduled packet send window. The unscheduled data packets of all the flows may share a quota provided by one unscheduled packet send window, to limit an injection quantity of the unscheduled data packets, thereby avoiding instantaneous buffer accumulation caused by a traffic burst, and reducing a network transmission latency. A total quantity of the unscheduled data packets is controlled, and is controlled by the debt signaling packet, to limit a size of a buffer occupied by the unscheduled data packet. Bandwidth used by the scheduled data packet is allocated by the grant signaling packet, to ensure that a buffer occupied by the scheduled data packet is relatively low (which may reach approximately 0), thereby reducing a network transmission latency. In this embodiment, a first RTT time is fully used to transmit data, and a small flow can be quickly transmitted. In addition, a quantity of data packets injected into the network is limited, buffer occupation is reduced, and a queuing latency is reduced, so that overall flow completion time is reduced. Compared with an existing congestion control technology in which a large quantity of priority queues in a switch needs to be used, a relatively small quantity of queues of a switch may be used in this embodiment.

It can be further learned from the foregoing embodiment that the data packet and the signaling packet can be scheduled in a coordinated manner. The sending device sets the first indication information or the second indication information in the data packet, to indicate the receiving device to reply with a signaling packet of a corresponding type. The signaling packet is classified into a debt signaling packet and a grant signaling packet. A shared quota of an unscheduled packet on the sending device side may be restored by using the debt signaling packet, and the grant signaling packet may be used to drive the sending device to send the scheduled data packet.

In some embodiments of the present disclosure, rate control may be performed on sending of the debt signaling packet and the grant signaling packet, so that a common sending rate of the debt signaling packet and the grant signaling packet does not exceed a specified threshold. For example, the specified threshold is x % bandwidth, where x may be set based on a ratio of a length of the data packet to a length of the grant signaling packet. For example, the threshold of the common sending rate of the debt signaling packet and the grant signaling packet may be set to 5%. The sending rate of the signaling packet is controlled, and the debt signaling packet and the grant signaling packet can share a specific proportion of bandwidth. Because the debt signaling packet and the grant signaling packet each may drive sending of the unscheduled data packet and the scheduled data packet on the sending device side by increasing a size of a corresponding send window, sending speeds of the unscheduled data packet and the scheduled data packet are limited, and therefore sending speeds of the debt signaling packet and the grant signaling packet are limited, which is equivalent to performing reverse rate limitation on sending of the unscheduled data packet and the scheduled data packet on the sending device side, thereby alleviating or avoiding buffer queue overstock and improving network performance.

In this embodiment, rate limiting control on the debt signaling packet and the grant signaling packet may be implemented on the receiving device side, or may be implemented on the switching device.

Further, in some embodiments, a priority of the debt signaling packet may be set to be higher than that of the grant signaling packet, thereby ensuring that the debt signaling packet is preferably sent.

FIG. 7a-1 and FIG. 7a-2 and FIG. 7b-1 and FIG. 7b-2 are examples of flowcharts of a congestion control method implemented on a sending device side according to an embodiment of the present disclosure. FIG. 8 is an example of a flowchart of a congestion control method implemented on a receiving device side according to an embodiment of the present disclosure. The method may be applied to the data center network shown in FIG. 1, or certainly may be applied to another switching network in addition to the data center network shown in FIG. 1. This is not limited in the present disclosure. When the method is applied to the data center network shown in FIG. 1, the sending device and the receiving device in the method may be any two terminal devices in FIG. 1.

Figures 1, 7A:
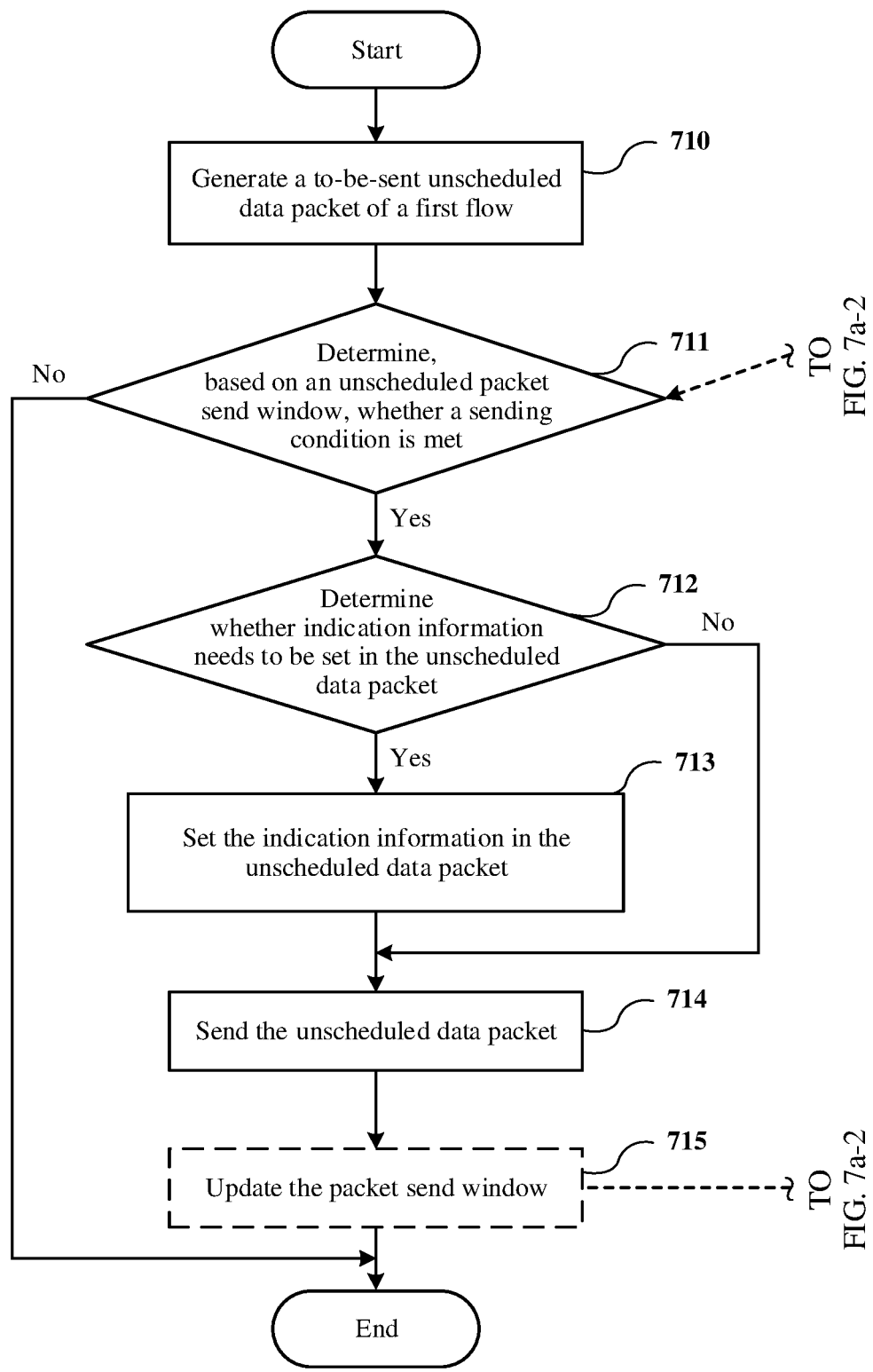
Figures 2, 7A:
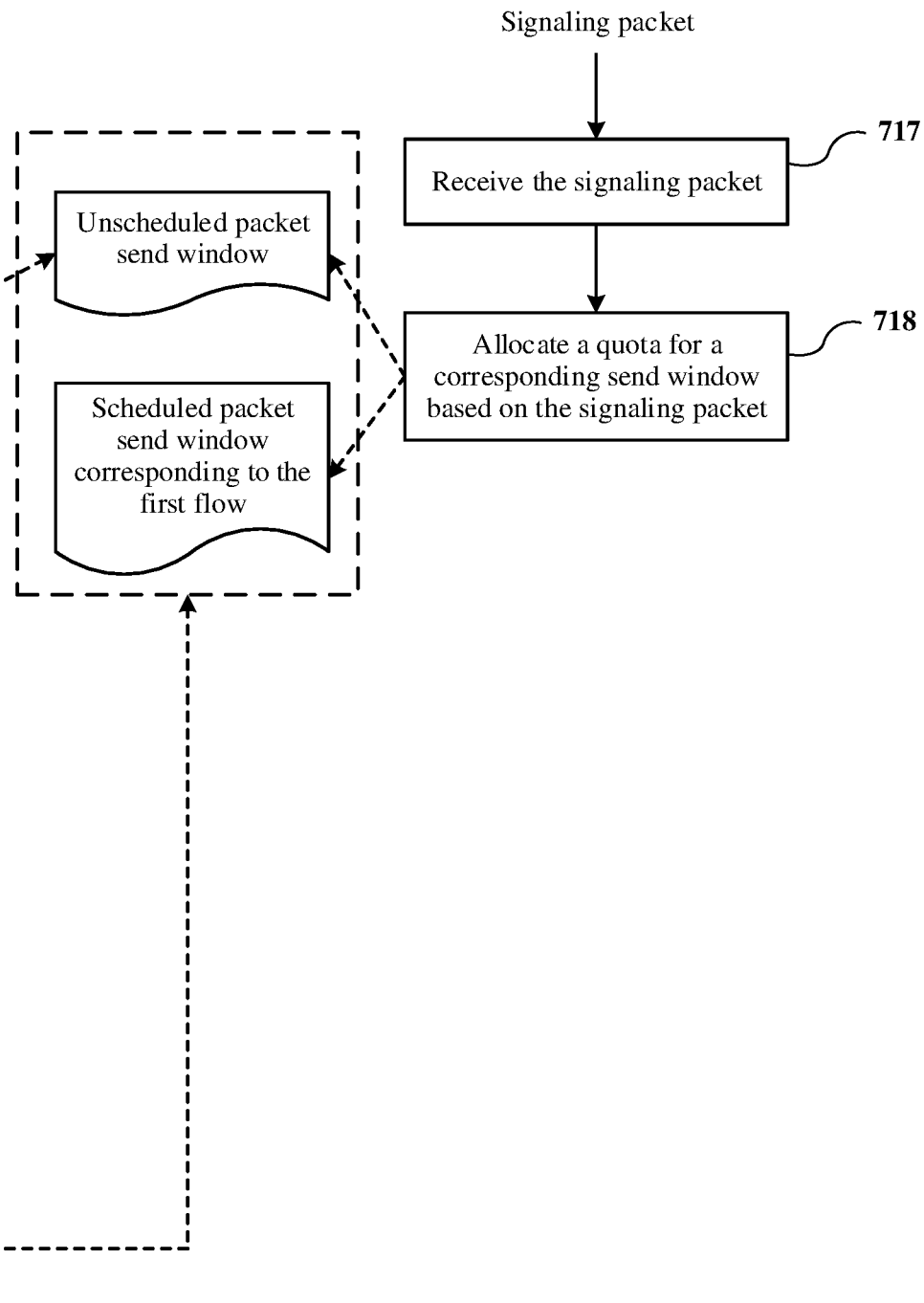
Figure 8:
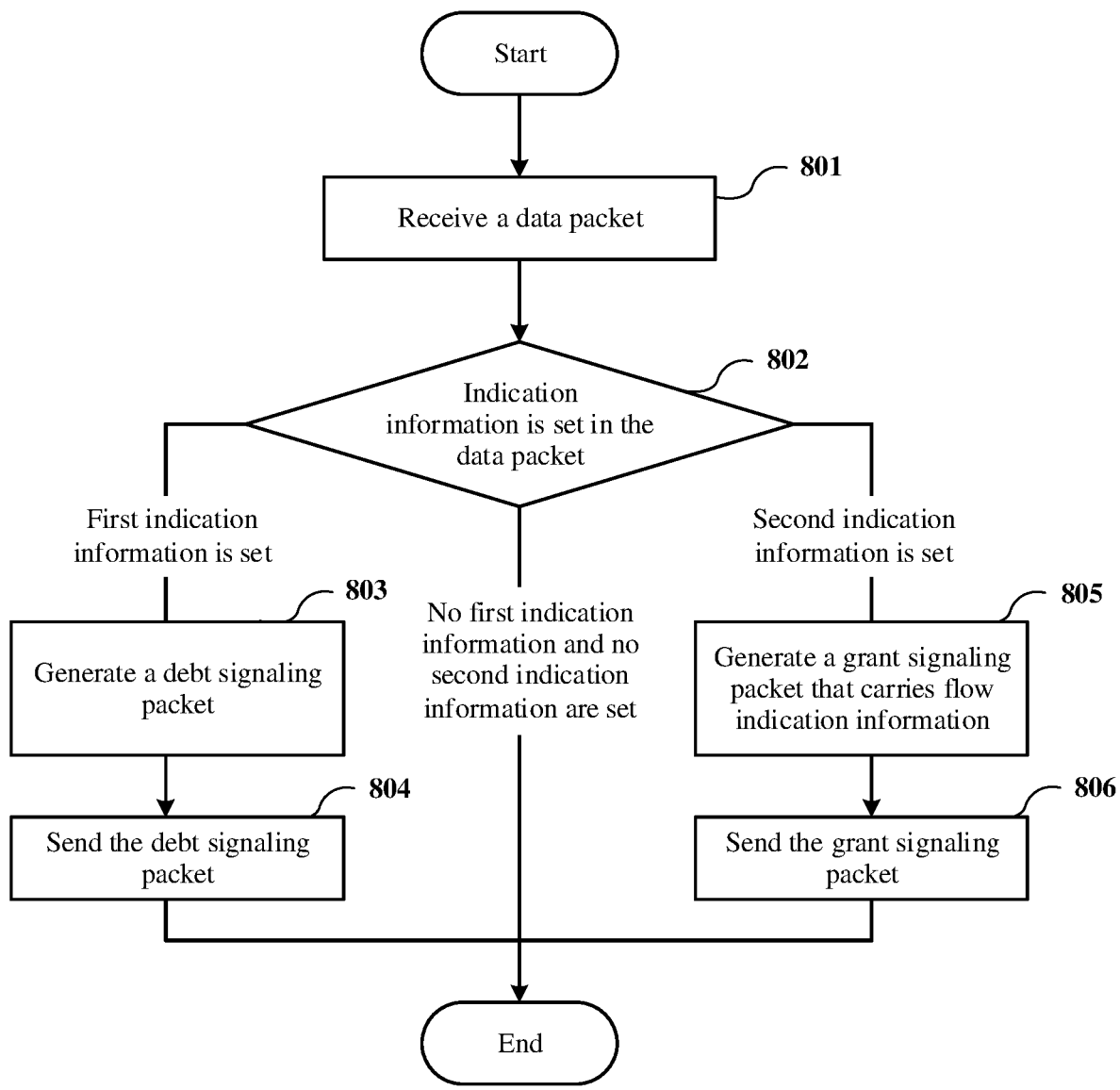
FIG. 8 is a schematic diagram of a process in which a receiving device performs congestion control on data packet transmission according to embodiment of the present disclosure.

Refer to FIG. 7a-1 and FIG. 7a-2. This procedure describes a process in which the sending device sends an unscheduled data packet and performs congestion control on transmission of the unscheduled data packet. Before the procedure starts, initial system parameter configuration may be first performed, which may specifically include: initializing an unscheduled packet send window, for example, setting an initial value of the unscheduled packet send window to RTTbyte*m; and initializing a scheduled packet send window corresponding to each flow, for example, setting an initial value of the scheduled packet send window to 0.

As shown in the figure, the process may include the following steps:

Step 710: The sending device generates a to-be-sent unscheduled data packet of a first flow.

The "first flow" refers to any flow. For ease of description, the first flow is used as an example for description in this procedure.

Data carried in a data packet currently generated by the sending device is data within a data length corresponding to a first RTT of the first flow. Therefore, the data packet is the unscheduled data packet.

Step 711: The sending device determines, based on a size of an unscheduled packet send window and the to-be-sent unscheduled data packet, whether the unscheduled data packet meets a sending condition, and if the unscheduled data packet meets the sending condition, goes to step 712; otherwise, ends this procedure.

In this step, if the sending device determines that a quantity of bytes of the to-be-sent unscheduled data packet is less than or equal to the size of the unscheduled packet send window, it is determined that the sending condition is met; otherwise, it is determined that the sending condition is not met.

Step 712: The sending device determines whether indication information needs to be set in the unscheduled data packet, and if it is determined that the indication information needs to be set in the unscheduled data packet, goes to step 713; otherwise, goes to step 714.

In this step, if the sending device determines that a count value of a first counter reaches M bytes, the sending device determines that first indication information needs to be set in the unscheduled data packet (for example, a flag bit A is set), and clears the first counter; or if the sending device determines that a count value of a second counter reaches M bytes, and the first flow still has to-be-sent data after one RTT, the sending device determines that second indication information needs to be set in the unscheduled data packet (for example, a flag bit B is set), and clears the second counter. The first indication information indicates the receiving device to send a debt signaling packet, and the second indication information indicates the receiving device to send a grant signaling packet.

Step 713: The sending device sets corresponding indication information in the to-be-sent unscheduled data packet based on a determined result in step 712, and goes to step 714.

In this step, based on the determined result in step 712, the sending device may set a flag bit A in a header of the to-be-sent unscheduled data packet to 1, and/or set a flag bit B in a header of the to-be-sent unscheduled data packet to 1.

Step 714: The sending device sends the unscheduled data packet.

Step 715: The sending device updates the packet send window based on a data sending status.

This step is optional.

When a quantity of bytes counted by the first counter reaches M bytes, the unscheduled packet send window is reduced by M bytes. When a quantity of bytes counted by the second counter reaches M bytes, a scheduled packet send window corresponding to the first flow is reduced by M bytes.

In the foregoing procedure, if the sending device sets the first indication information in the unscheduled data packet in step 713, in subsequent steps 717 and 718, after receiving the debt signaling packet from the receiving device, the sending device adds a quota for the unscheduled packet send window based on the debt signaling packet, for example, increases the size of the unscheduled packet send window by M bytes. If the sending device sets the second indication information in the unscheduled data packet in step 713, in subsequent steps 717 and 718, after receiving the grant signaling packet from the receiving device, the sending device adds, based on indication information that is of the first flow and that is carried in the grant signaling packet, a quota for the scheduled packet send window corresponding to the first flow, for example, increases a size of the scheduled packet send window by M bytes.

If the unscheduled data packet still needs to be sent subsequently, processing may be performed according to the procedure shown in FIG. 7a-1 and FIG. 7a-2; and if the scheduled data packet still needs to be sent subsequently, processing may be performed according to the procedure shown in FIG. 7b-1 and FIG. 7b-2.

Figures 1, 7B:
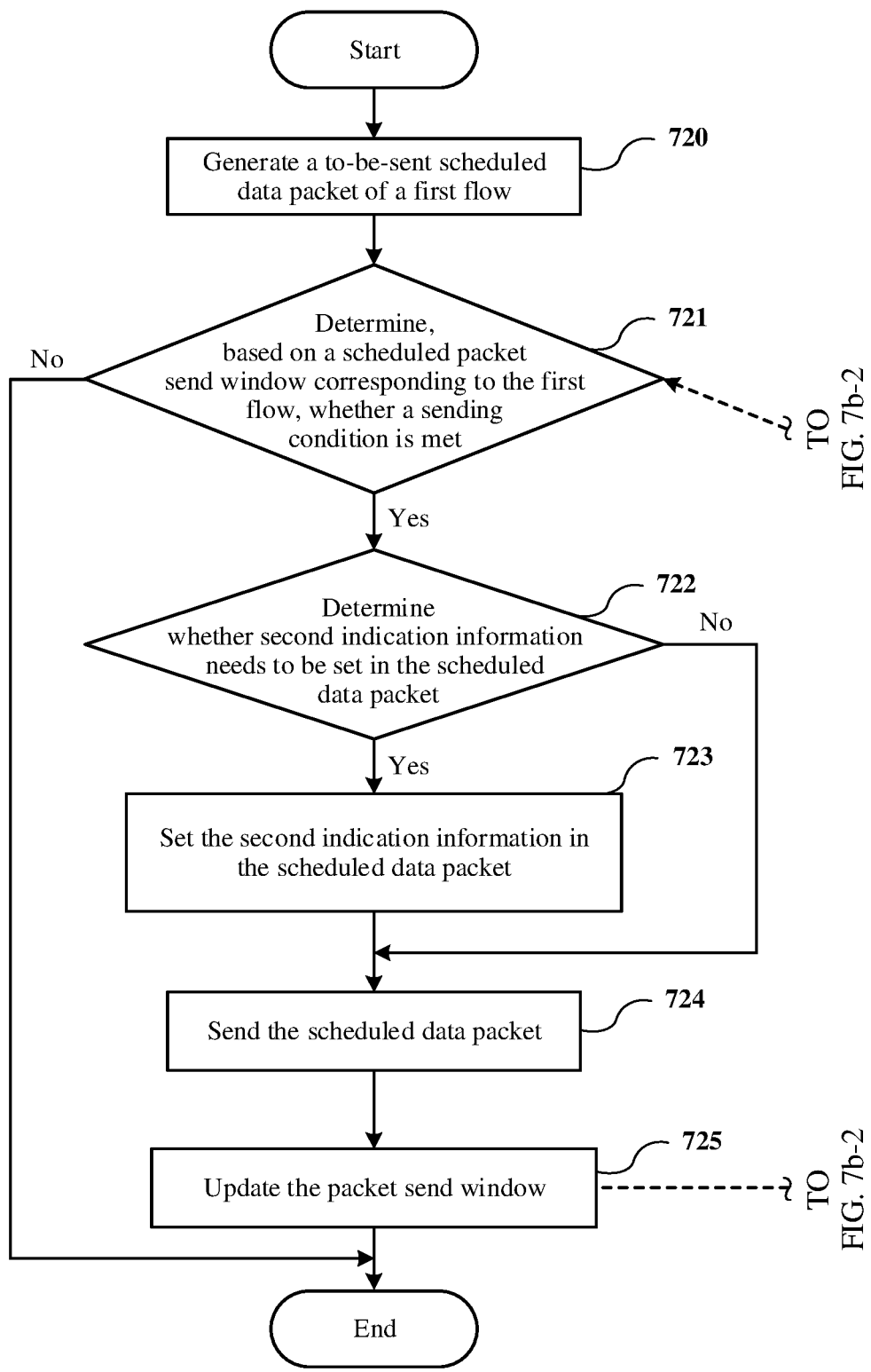
Figures 2, 7B:
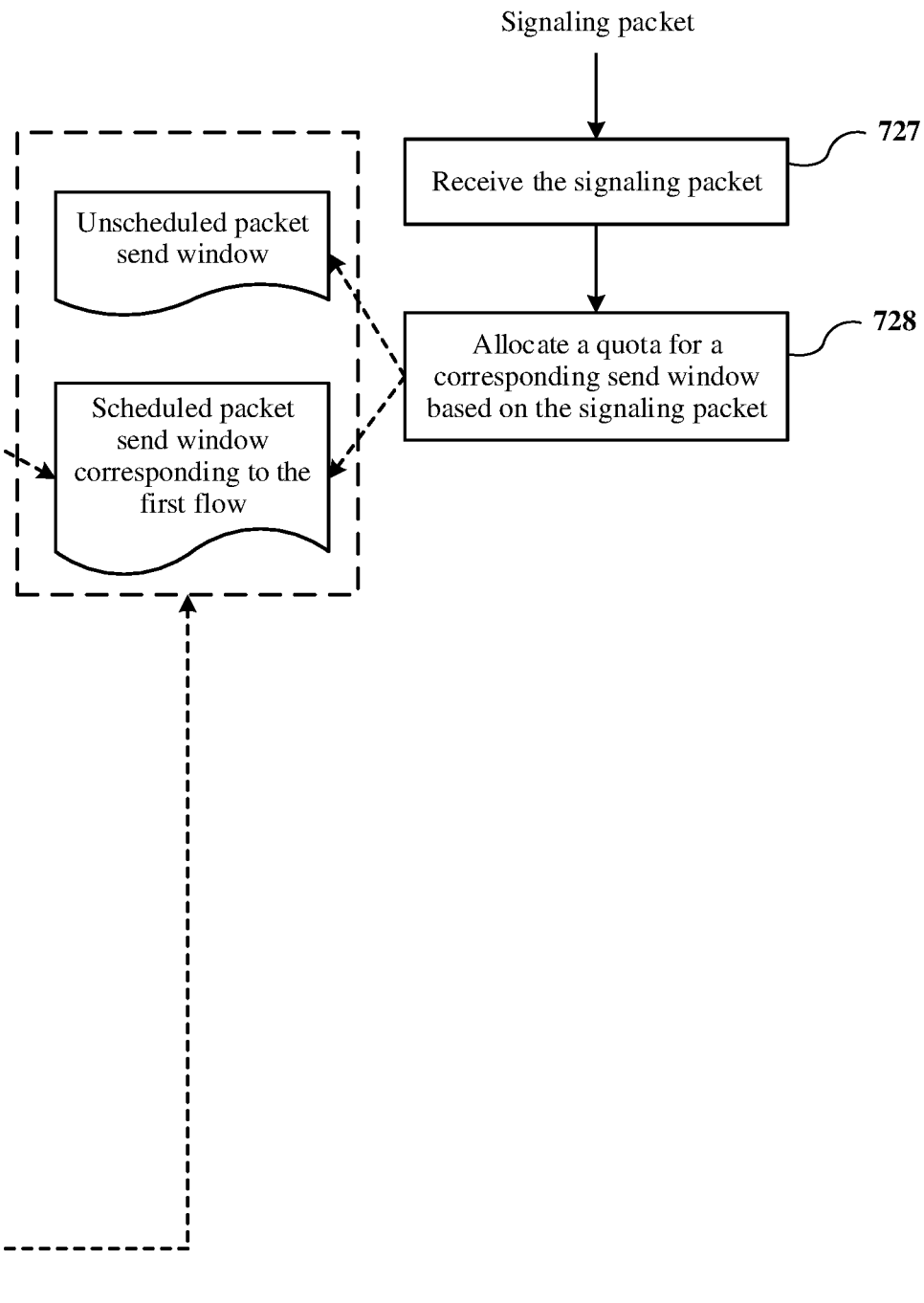

Refer to FIG. 7b-1 and FIG. 7b-2. This procedure describes a process in which the sending device sends a scheduled data packet and performs congestion control on transmission of the scheduled data packet. Before the procedure starts, initial system parameter configuration may be first performed, which may include: initializing an unscheduled packet send window, for example, setting an initial value of the unscheduled packet send window to RTTbyte*m; and initializing a scheduled packet send window corresponding to each flow, for example, setting an initial value of the scheduled packet send window to 0.

As shown in the figure, the process may include the following steps:

Step 720: The sending device generates a scheduled data packet of a first flow.

The "first flow" refers to any flow. For ease of description, the first flow is used as an example for description in this procedure.

Data carried in a data packet currently generated by the sending device is data after a data length corresponding to a first RTT of the first flow. Therefore, the data packet is the scheduled data packet.

Step 721: The sending device determines, based on a size of a scheduled packet send window corresponding to the first flow and the to-be-sent scheduled data packet, whether the scheduled data packet meets a sending condition, and if the scheduled data packet meets the sending condition, goes to step 722; otherwise, ends this procedure.

In this step, if the sending device determines that a quantity of bytes of the to-be-sent scheduled data packet is less than or equal to the size of the scheduled packet send window corresponding to the first flow, it is determined that the sending condition is met; otherwise, it is determined that the sending condition is not met.

Step 722: The sending device determines whether indication information needs to be set in the scheduled data packet, and if it is determined that the indication information needs to be set in the scheduled data packet, goes to step 723; otherwise, goes to step 724.

In this step, if the sending device determines that a count value of a second counter reaches M bytes, and the first flow still has to-be-sent data after one RTT, the sending device determines that second indication information needs to be set in the scheduled data packet (for example, a flag bit B is set), and clears the second counter. The second indication information indicates the receiving device to send a grant signaling packet.

Step 723: The sending device sets the second indication information in the scheduled data packet, and the goes to step 724.

In this step, the sending device may set a flag bit B in a header of the to-be-sent scheduled data packet to 1, to trigger the receiving device to send the grant signaling packet for the first flow.

Step 724: The sending device sends the scheduled data packet.

Step 725: The sending device updates the packet send window based on a data sending status.

This step is optional. When the count value of the second counter reaches M bytes, the scheduled packet send window corresponding to the first flow is reduced by M bytes.

In the foregoing procedure, if the sending device sets the second indication information in the scheduled data packet in step 723, in subsequent steps 727 and 728, after receiving the grant signaling packet (which carries indication information of the first flow) from the receiving device, the sending device adds, based on the grant signaling packet, a quota for the scheduled packet send window corresponding to the first flow, for example, increases the size of the scheduled packet send window by M bytes.

If the scheduled data packet still needs to be sent subsequently, processing may be performed according to the procedure shown in FIG. 7b-1 and FIG. 7b-2; and if the unscheduled data packet still needs to be sent subsequently, processing may be performed according to the procedure shown in FIG. 7a-1 and FIG. 7a-2.

Refer to FIG. 8. The procedure describes a process in which a receiving device performs congestion control on transmission of a data packet.

As shown in the figure, the process may include the following steps:

Step 801: The receiving device receives a data packet sent by a sending device.

The data packet received by the receiving device may be an unscheduled data packet, or may be a scheduled data packet.

Step 802: The receiving device determines whether indication information is set in the currently received data packet; if first indication information is set, goes to step 803; if second indication information is set, goes to step 805; otherwise, packet processing is performed in a conventional method and ends the process.

In this step, if the receiving device determines, after parsing the data packet, that a flag bit A in a header of the data packet is set to 1, it indicates that the first indication information is set in the data packet; or if the receiving device determines, after parsing the data packet, that a flag bit B in a header of the data packet is set to 1, it indicates that the second indication information is set in the data packet.

Step 803 and step 804: The receiving device generates a debt signaling packet, and sends the debt signaling packet to the sending device of the data packet.

Step 805 and step 806: The receiving device generates a grant signaling packet, where the grant signaling packet carries flow indication information, and sends the grant signaling packet to the sending device of the data packet.

In this step, the receiving device obtains the flow indication information in the data packet, and sends the grant signaling packet including the flow indication information to the sending device, so that the sending device increases, based on the flow indication information, a quota for a scheduled packet send window corresponding to a corresponding flow.

In some embodiments, in the foregoing step 804 and step 806, the receiving device may perform rate control on sending of the signaling packet, so that sending rates of the debt signaling packet and the grant signaling packet do not exceed a specified threshold.

The following describes an implementation process of the embodiments of the present disclosure based on one or a combination of the foregoing embodiments and with reference to the structures of the sending device and the receiving device shown in FIG. 6.

Figure 9:
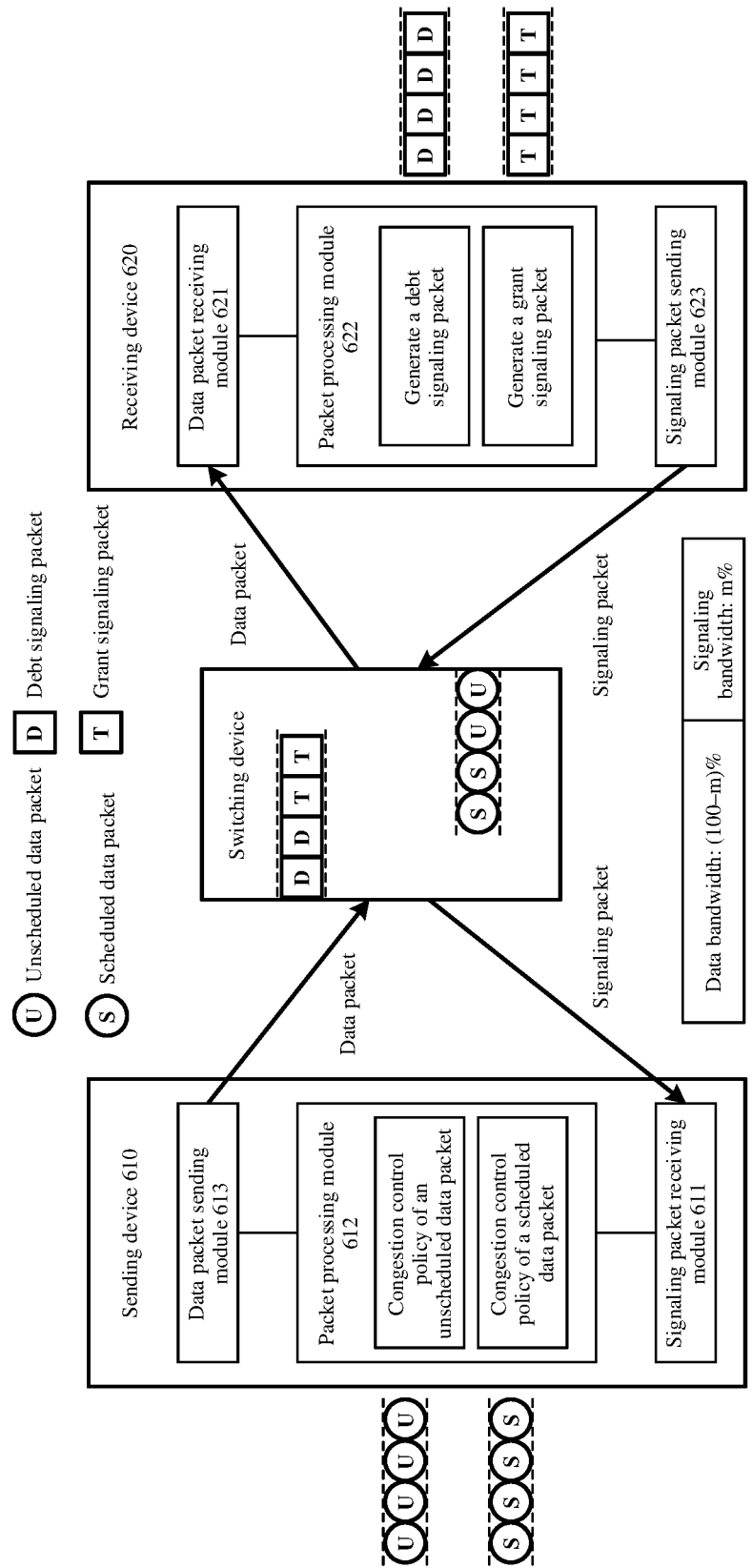
FIG. 9 is a schematic diagram of data packet and signaling packet transmission between a sending device and a receiving device according to an embodiment of the present disclosure.

Refer to FIG. 9. After generating an unscheduled data packet of a first flow (for example, a flow 1), the packet processing module 612 of the sending device 610 performs the following processing according to a congestion control policy of the unscheduled data packet:

If it is determined that a quantity of bytes of the unscheduled data packet is less than or equal to a size of an unscheduled packet send window, it is determined that a sending condition is met, and it is further determined whether the following condition is met.

Condition 1: A count value of a first counter reaches M bytes; and

Condition 2: A count value of a second counter reaches M bytes, and the first flow still has to-be-sent data after one RTT.

If the foregoing condition 1 is met, a flag bit A in a header of the to-be-sent unscheduled data packet is set to 1; and if the foregoing condition 2 is met, a flag bit B in a header of the to-be-sent unscheduled data packet is set to 1, and then a set unscheduled data packet is submitted to the data packet sending module 613. If neither the condition 1 nor the condition 2 is met, the unscheduled data packet is directly submitted to the data packet sending module 613.

If it is determined that a quantity of bytes of the unscheduled data packet is greater than a size of an unscheduled packet send window, it is determined that a sending condition is not met. Therefore, the unscheduled data packet is not sent, or the unscheduled data packet is sent after the unscheduled packet send window meets the sending condition.

The data packet sending module 613 of the sending device 610 sends the unscheduled data packet after receiving the unscheduled data packet from the packet processing module 612, where the unscheduled data packet is routed by the switching device to the receiving device 620.

After receiving the data packet, the data packet receiving module 621 in the receiving device 620 parses the data packet, and sends a parsing result to the packet processing module 622.

The packet processing module 622 finds, based on the parsing result, that a flag bit A in a packet header of the data packet is set to 1, generates a debt signaling packet, and submits the debt signaling packet to the signaling packet sending module 623. The signaling packet sending module 623 sends the debt signaling packet, and the debt signaling packet is routed by the switch device to the sending device 610. If the packet processing module 622 finds, based on the parsing result, that the flag bit A in the packet header of the data packet is not set to 1 (which is set to 0 by default), the debt signaling packet is not generated.

The packet processing module 622 finds, based on the parsing result, that a flag bit B in a packet header of the data packet is set to 1, generates a grant signaling packet (which carries indication information of the first flow), and submits the grant signaling packet to the signaling packet sending module 623. The signaling packet sending module 623 sends the grant signaling packet, and the grant signaling packet is routed by the switch device to the sending device 610. If the packet processing module 622 finds, based on the parsing result, that the flag bit B in the packet header of the data packet is not set to 1 (which is set to 0 by default), the grant signaling packet is not generated.

After receiving the debt signaling packet, the signaling packet receiving module 611 of the sending device 610 submits the debt signaling packet to the packet processing module 612. The packet processing module 612 increases the size of the unscheduled packet send window by M bytes based on the debt signaling packet. After receiving the grant signaling packet, the signaling packet receiving module 611 of the sending device 610 submits the grant signaling packet to the packet processing module 612. The packet processing module 612 increases, based on the grant signaling packet, a size of a scheduled packet send window corresponding to the first flow by M bytes.

It should be noted that, after the packet processing module 612 of the sending device 610 generates an unscheduled data packet of another flow (for example, a flow 2), a processing process of the unscheduled data packet is similar to the foregoing process, and details are not described herein again.

After generating a scheduled data packet of the first flow (for example, a flow 1), the packet processing module 612 of the sending device 610 performs the following processing according to a congestion control policy of the scheduled data packet:

If it is determined that a quantity of bytes of the scheduled data packet is less than or equal to a size of a scheduled packet send window corresponding to the flow 1, it is determined that a sending condition is met, and it is further determined whether a count value of a second counter reaches M bytes and whether the flow 1 still has to-be-sent data after one RTT. If it is determined that the count value of the second counter reaches M bytes and that the flow 1 still has the to-be-sent data after one RTT, a flag bit B in a header of the to-be-sent scheduled data packet is set to 1, and a set scheduled data packet is submitted to the data packet sending module 613; otherwise, the scheduled data packet is directly submitted to the data packet sending module 613.

If the packet processing module 612 determines that a quantity of bytes of the scheduled data packet is greater than a size of a scheduled packet send window corresponding to the flow 1, the packet processing module 612 determines that a sending condition is not met. Therefore, the packet processing module 612 gives up sending the scheduled data packet, or sends the scheduled data packet when the scheduled packet send window corresponding to the flow 1 meets the sending condition.

The data packet sending module 613 of the sending device 610 sends the scheduled data packet after receiving the scheduled data packet from the packet processing module 612, where the scheduled data packet is routed by the switching device to the receiving device 620.

After receiving the data packet, the data packet receiving module 621 in the receiving device 620 parses the data packet, and sends a parsing result to the packet processing module 622. The packet processing module 622 finds, based on the parsing result, that a flag bit B in a packet header of the data packet is set to 1, obtains flow indication information (that is, flow indication information of the flow 1) in the data packet, generates a grant signaling packet (which carries the flow indication information), and submits the grant signaling packet to the signaling packet sending module 623. The signaling packet sending module 623 sends the grant signaling packet, and the grant signaling packet is routed by the switch device to the sending device 610. If the packet processing module 622 finds, based on the parsing result, that the flag bit B in the packet header of the data packet is not set to 1 (which is set to 0 by default), the grant signaling packet is not generated.

After receiving the grant signaling packet, the signaling packet receiving module 611 of the sending device 610 submits the grant signaling packet to the packet processing module 612. The packet processing module 612 increases, based on the flow indication information in the grant signaling packet, the size of the scheduled packet send window corresponding to the flow 1 by M bytes.

It should be noted that, after the packet processing module 612 of the sending device 610 generates a scheduled data packet of another flow (for example, a flow 2), a processing process of the scheduled data packet is similar to the foregoing process, and details are not described herein again.

In some embodiments, the signaling packet sending module 623 in the receiving device limits a common sending rate of the debt signaling packet and the grant signaling packet to x % bandwidth. In some other embodiments, alternatively, the switching device may perform rate limiting on a priority queue corresponding to the signaling packet on the switching device, thereby limiting a common sending rate of the debt signaling packet and the grant signaling packet to x % bandwidth.

Based on the foregoing descriptions, the transmit-end-driven and receive-end-driven congestion control method is provided in this embodiment. A congestion control mechanism coordinated based on the data packet and the signaling packet fills a disadvantage of the current transmit-end-driven congestion control method and the current receive-end-driven congestion control method. Flow completion time (FCT) is reduced, and buffer occupation of a network device can be reduced, thereby reducing a network transmission latency. In this embodiment, a small quantity of priority queues may be used to implement a receiving and sending mixed driving manner and bandwidth allocation, thereby ensuring a network throughput and improving network performance.

The foregoing embodiments of the present disclosure may be deployed only at the transmit end and the receive end, so that a buffer can be effectively reduced. A convergence function of the switching device can be used to further reduce use of the buffer. A traffic model does not need to be known in advance to classify a priority of each flow.

Based on a same inventive concept, an embodiment of the present disclosure further provides a communication apparatus. The communication apparatus may be the sending device in the foregoing embodiment, or may be a chip or a chip system that can support the sending device in implementing the foregoing method. When the communication apparatus is the sending device in the foregoing embodiment, the communication apparatus has a behavior function of the sending device in the foregoing method embodiment. The communication apparatus may also be the receiving device in the foregoing embodiment, or may be a chip or a chip system that can support the foregoing receiving device in implementing the foregoing method. When the communication apparatus is the receiving device in the foregoing embodiment, the communication apparatus has a behavior function of the receiving device in the foregoing method embodiment.

When the communication apparatus is applied to the data center network, as shown in FIG. 1, the communication apparatus may be a terminal device in the data center network.

When the communication apparatus is the sending device in the foregoing embodiments, referring to FIG. 6, the communication apparatus includes a signaling packet receiving module, a packet processing module, and a data packet sending module. For functions of the modules, refer to the description in the foregoing embodiment, and details are not described herein again.

When the communication apparatus is the receiving device in the foregoing embodiment, referring to FIG. 6, the communication apparatus includes a signaling packet sending module, a packet processing module, and a data packet receiving module. For functions of the modules, refer to the description in the foregoing embodiment, and details are not described herein again.

In addition, an embodiment of the present disclosure further provides a communication apparatus 1000. The communication apparatus may have a structure shown in FIG. 10. The communication apparatus may be a sending device, or may be a chip or a chip system that can support the sending device in implementing the foregoing method. The communication apparatus may alternatively be a receiving device, or may be a chip or a chip system that can support the receiving device in implementing the foregoing method.

Figure 10:
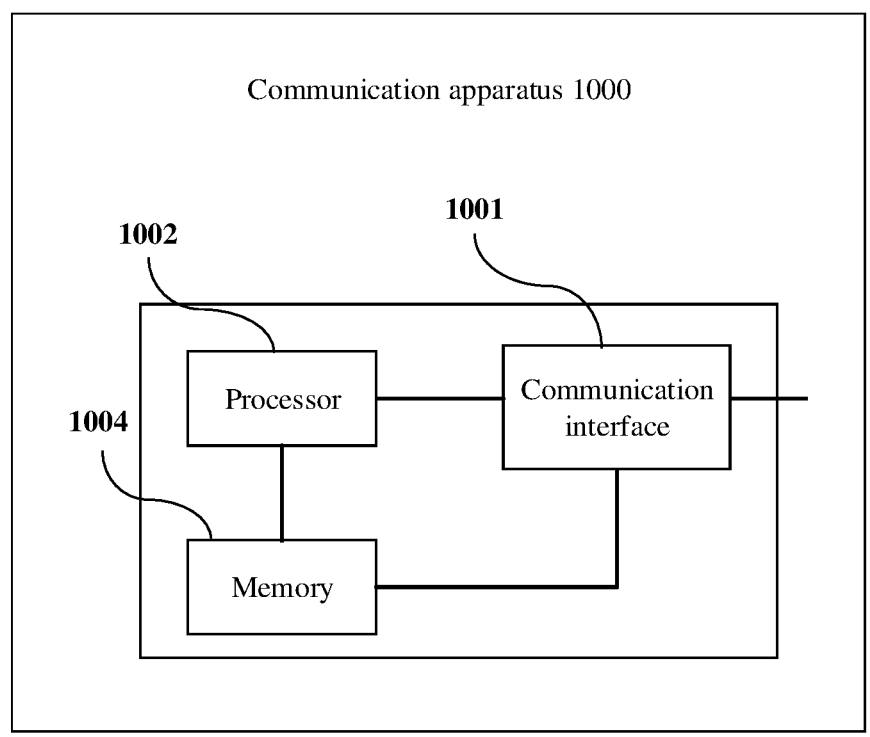
FIG. 10 is a schematic diagram of a structure of a communication apparatus according to an embodiment of the present disclosure.

The communication apparatus 1000 shown in FIG. 10 may include at least one processor 1002. The at least one processor 1002 is configured to: be coupled to a memory, and read and execute instructions in the memory, to implement the steps related to the sending device in the method provided in the embodiments of the present disclosure. Optionally, the communication apparatus 1000 may further include a communication interface 1001, configured to support the communication apparatus 1000 in receiving or sending signaling or data. The communication interface 1001 in the communication apparatus 1000 may be used by the communication apparatus 1000 to perform the steps of receiving and sending the data packet or the signaling packet in the method shown in FIG. 7a-1 and FIG. 7a-2, FIG. 7b-1 and FIG. 7b-2, or FIG. 8. The processor 1002 may be configured to perform, by the communication apparatus 1000, the steps of packet processing and congestion control in the method shown in FIG. 7a-1 and FIG. 7a-2, FIG. 7b-1 and FIG. 7b-2, or FIG. 8. Optionally, the communication apparatus 1000 may further include a memory 1004. The memory 1004 stores a computer program and instructions. The memory 1004 may be coupled to the processor 1002 and/or the communication interface 1001, to support the processor 1002 in invoking the computer program and instructions in the memory 1004 to implement the steps performed by the sending device in the method provided in the foregoing embodiment of the present disclosure. In addition, the memory 1004 may be further configured to store data in the foregoing method embodiment of the present disclosure. For example, the memory 1004 is configured to store data and instructions that are required for supporting the communication interface 1001 in interaction, and/or configured to store configuration information required for the communication apparatus 1000 to perform the method in the foregoing embodiment of the present disclosure.

Based on the same concept as the foregoing method embodiments, an embodiment of the present disclosure further provides a computer-readable storage medium. The computer-readable storage medium stores instructions. When these instructions are invoked and executed by a computer, the computer is enabled to perform the method in the foregoing method embodiments and any possible design of the foregoing method embodiments. In this embodiment, the computer-readable storage medium is not limited. For example, the computer-readable storage medium may be a RAM (random-access memory) or a ROM (read-only memory).

Based on a same concept as the foregoing method embodiments, an embodiment of the present disclosure further provides a computer program product. When being invoked and executed by a computer, the computer program product can perform the method in the foregoing method embodiments and any possible design of the foregoing method embodiments.

Based on a same concept as the foregoing method embodiments, an embodiment of the present disclosure further provides a chip. The chip may include a processor and an interface circuit, to complete the method in the foregoing method embodiments and any possible implementation of the foregoing method embodiments. "Coupling" means that two components are directly or indirectly combined with each other. The combination may be fixed or movable, and the combination may allow communication of fluid, electricity, an electrical signal, or another type of signal between two components.

The foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The various illustrative logical units and circuits in embodiments of the present disclosure may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of the present disclosure may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. Exemplarily, the storage medium may connect to a processor so that the processor may read information from the storage medium and write information to the storage medium. Alternatively, the storage medium may be integrated into a processor. The processor and the storage medium may be disposed in an ASIC, and the ASIC may be disposed in a terminal device. Optionally, the processor and the storage medium may alternatively be disposed in different components of the terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present invention is described with reference to specific features and the embodiments thereof, it is clear that various modifications and combinations may be made to them without departing from the scope of the present invention. Correspondingly, the specification and accompanying drawings are merely example descriptions of the present invention defined by the appended claims, and is considered as any of or all modifications, variations, combinations or equivalents that cover the scope of the present invention. It is clearly that, a person skilled in the art can make various modifications and variations to the present invention without departing from the scope of the present invention. The present invention is intended to cover these modifications and variations provided that they fall within the scope of protection defined by the following claims and their equivalent technologies.

What is claimed is:

1. A congestion control method, comprising:
generating, by a sending device, a to-be-sent unscheduled data packet of a first flow; upon determining, based on an unscheduled packet send window shared by all flows, that the to-be-sent unscheduled data packet meets a sending condition, determining whether to request to add a quota for the unscheduled packet send window and/or a scheduled packet send window corresponding to the first flow, wherein determination of whether a scheduled data packet of the first flow meets the sending condition is based on the scheduled packet send window corresponding to the first flow; and
upon determining that the quota needs to be requested to be added for the unscheduled packet send window and/or the scheduled packet send window corresponding to the first flow, setting indication information in the to-be-sent unscheduled data packet, and sending, to a receiving device, the to-be-sent unscheduled data packet in which the indication information is set, wherein the indication information indicates the receiving device to send a signaling packet, to trigger the sending device to add the quota for the unscheduled packet send window and/or the scheduled packet send window corresponding to the first flow.

2. The method according to claim 1, wherein the determining whether to request to add a quota for the unscheduled packet send window and/or a scheduled packet send window corresponding to the first flow comprises:

when a count value of a first counter reaches a threshold, determining that the quota needs to be requested to be added for the unscheduled packet send window, wherein an accumulated amount of data sent by unscheduled data packets of all the flows is counted using the first counter, and the first counter is cleared after it is determined that the quota needs to be requested to be added for the unscheduled packet send window; and
when a count value of a second counter reaches the threshold, and the first flow still has to-be-sent data after one round-trip time, determining that the quota needs to be requested to be added for the scheduled packet send window corresponding to the first flow, wherein an accumulated amount of data sent by a data packet of the first flow is counted using the second counter, and the second counter is cleared after it is determined that the quota needs to be requested to be added for the scheduled packet send window corresponding to the first flow.

3. The method according to claim 2, further comprising:
receiving, by the sending device, the signaling packet sent by the receiving device, and adding, based on the signaling packet, the quota for the unscheduled packet send window and/or the scheduled packet send window corresponding to the first flow to generate an added quota, wherein
the added quota is equal to an amount of data corresponding to the threshold.

4. The method according to claim 2, further comprising:
when the count value of the first counter reaches the threshold, reducing the unscheduled packet send window by a quota corresponding to the threshold; and
when the count value of the second counter reaches the threshold, reducing the scheduled packet send window corresponding to the first flow by the quota corresponding to the threshold.

5. The method according to claim 1, wherein the setting indication information in the to-be-sent unscheduled data packet comprises:
when it is determined that the quota needs to be requested to be added for the unscheduled packet send window, setting first indication information in the to-be-sent unscheduled data packet, wherein the first indication information indicates the receiving device to send a debt signaling packet, and the debt signaling packet triggers the sending device to add the quota for the unscheduled packet send window; and
when it is determined that the quota needs to be requested to be added for the scheduled packet send window corresponding to the first flow, setting second indication information in the to-be-sent unscheduled data packet, wherein the second indication information indicates the receiving device to send a grant signaling packet, and the grant signaling packet triggers the sending device to add the quota for the unscheduled packet send window corresponding to the first flow.

6. The method according to claim 5, further comprising:
receiving, by the sending device, the debt signaling packet, and adding the quota for the unscheduled packet send window based on the debt signaling packet; and/or
receiving, by the sending device, the grant signaling packet, wherein the grant signaling packet carries indication information of the first flow, and adding, by the sending device based on the grant signaling packet, the quota for the scheduled packet send window corresponding to the first flow.

7. The method according to claim 1, further comprising:
generating, by the sending device, a to-be-sent scheduled data packet of the first flow;
upon determining, based on the scheduled packet send window corresponding to the first flow, that the scheduled data packet meets the sending condition, determining, by the sending device, whether to request to add the quota for the scheduled packet send window corresponding to the first flow;
upon determining that the quota needs to be requested to be added for the scheduled packet send window corresponding to the first flow, setting, by the sending device, indication information in the scheduled data packet, wherein the indication information indicates the receiving device to send a grant signaling packet; and
receiving, by the sending device, the grant signaling packet sent by the receiving device, wherein the grant signaling packet carries the indication information of the first flow, and adding, by the sending device based on the grant signaling packet, the quota for the scheduled packet send window corresponding to the first flow.

8. The method according to claim 1, wherein an initial value of the unscheduled packet send window is configured as RTTByte*m bytes, RTTByte indicates a quantity of bytes that are sent in one round-trip time, and m is an integer greater than or equal to 1; and an initial value of the scheduled packet send window corresponding to the first flow is configured as 0.

9. A congestion control method, comprising:
receiving, by a receiving device, a data packet sent by a sending device; when first indication information is set in the data packet, generating a debt signaling packet, and sending the debt signaling packet to the sending device, wherein the debt signaling packet triggers the sending device to add a quota for an unscheduled packet send window shared by all flows; and
when second indication information is set in the data packet, generating a grant signaling packet, and sending the grant signaling packet to the sending device, wherein the grant signaling packet carries flow indication information, the flow indication information is the same as flow indication information carried in the data packet, and the grant signaling packet triggers the sending device to add a quota for a scheduled packet send window corresponding to a corresponding flow.

10. The method according to claim 9, wherein when sending the debt signaling packet and the grant signaling packet, the sending device sends the debt signaling packet and the grant signaling packet based on a packet sending rate shared by the debt signaling packet and the grant signaling packet.

11. A device, comprising at least one processor connected to a memory, wherein the memory stores a program including instructions that, when executed by the at least one processor, enable the device to perform operations comprising:
generating a to-be-sent unscheduled data packet of a first flow;
upon determining, based on an unscheduled packet send window shared by all flows, that the to-be-sent unscheduled data packet meets a sending condition, determining whether to request to add a quota for the unscheduled packet send window and/or a scheduled packet send window corresponding to the first flow, wherein determination of whether a scheduled data packet of the first flow meets the sending condition is based on the scheduled packet send window corresponding to the first flow; and
when it is determined that the quota needs to be requested to be added for the unscheduled packet send window and/or the scheduled packet send window corresponding to the first flow, setting indication information in the to-be-sent unscheduled data packet, and sending, to a receiving device, the to-be-sent unscheduled data packet in which the indication information is set, wherein the indication information indicates the receiving device to send a signaling packet, to trigger the device to add the quota for the unscheduled packet send window and/or the scheduled packet send window corresponding to the first flow.

12. The device according to claim 11, wherein the determining whether to request to add a quota for the unscheduled packet send window and/or a scheduled packet send window corresponding to the first flow comprises:
when a count value of a first counter reaches a threshold, determining that the quota needs to be requested to be added for the unscheduled packet send window, wherein an accumulated amount of data sent by unscheduled data packets of all the flows is counted using the first counter, and the first counter is cleared after it is determined that the quota needs to be requested to be added for the unscheduled packet send window; and
when a count value of a second counter reaches the threshold, and the first flow still has to-be-sent data after one round-trip time, determining that the quota needs to be requested to be added for the scheduled packet send window corresponding to the first flow, wherein an accumulated amount of data sent by a data packet of the first flow is counted using the second counter, and the second counter is cleared after it is determined that the quota needs to be requested to be added for the scheduled packet send window corresponding to the first flow.

13. The device according to claim 12, wherein the program further comprises instructions that, when executed by the at least one processor, cause the device to:
receive the signaling packet sent by the receiving device, and add, based on the signaling packet, the quota for the unscheduled packet send window and/or the scheduled packet send window corresponding to the first flow to generate an added quota, wherein the added quota is equal to an amount of data corresponding to the threshold.

14. The device according to claim 12, wherein the program further comprises instructions that, when executed by the at least one processor, cause the device to:
when the count value of the first counter reaches the threshold, reduce the unscheduled packet send window by a quota corresponding to the threshold; and
when the count value of the second counter reaches the threshold, reduce the scheduled packet send window corresponding to the first flow by the quota corresponding to the threshold.

15. The device according to claim 11, wherein the setting indication information in the to-be-sent unscheduled data packet comprises:
when it is determined that the quota needs to be requested to be added for the unscheduled packet send window, setting first indication information in the to-be-sent unscheduled data packet, wherein the first indication information indicates the receiving device to send a debt signaling packet, and the debt signaling packet triggers the device to add the quota for the unscheduled packet send window; and when it is determined that the quota needs to be requested to be added for the scheduled packet send window corresponding to the first flow, setting second indication information in the to-be-sent unscheduled data packet, wherein the second indication information indicates the receiving device to send a grant signaling packet, and the grant signaling packet triggers the device to add the quota for the unscheduled packet send window corresponding to the first flow.

16. The device according to claim 15, wherein the program further comprises instructions that, when executed by the at least one processor, cause the device to:

receive the debt signaling packet, and add the quota for the unscheduled packet send window based on the debt signaling packet; and/or receive the grant signaling packet, wherein the grant signaling packet carries indication information of the first flow, and add, based on the grant signaling packet, the quota for the scheduled packet send window corresponding to the first flow.

17. The device according to claim 11, wherein the program further comprises instructions that, when executed by the at least one processor, cause the device to:

generate a to-be-sent scheduled data packet of the first flow;

upon determining, based on the scheduled packet send window corresponding to the first flow, that the scheduled data packet meets the sending condition, determine whether to request to add the quota for the scheduled packet send window corresponding to the first flow;

when it is determined that the quota needs to be requested to be added for the scheduled packet send window corresponding to the first flow, set indication information in the scheduled data packet, wherein the indication information indicates the receiving device to send a grant signaling packet; and receive the grant signaling packet sent by the receiving device, wherein the grant signaling packet carries the indication information of the first flow, and add, based on the grant signaling packet, the quota for the scheduled packet send window corresponding to the first flow.

18. The device according to claim 11, wherein an initial value of the unscheduled packet send window is configured as RTTByte*m bytes, RTTByte indicates a quantity of bytes that are sent in one round-trip time, and m is an integer greater than or equal to 1; and an initial value of the scheduled packet send window corresponding to the first flow is configured as 0.

* * * * *